United States Patent
Tidwell et al.

(10) Patent No.: US 8,935,721 B2
(45) Date of Patent: Jan. 13, 2015

(54) METHODS AND APPARATUS FOR CLASSIFYING AN AUDIENCE IN A CONTENT DISTRIBUTION NETWORK

(75) Inventors: Justin Tidwell, Waxhaw, NC (US); Eduardo G. Samame, Rowayton, CT (US); Bryan Santangelo, Tulsa, OK (US)

(73) Assignee: Time Warner Cable Enterprises LLC, New York, NY (US)

( * ) Notice: Subject to any disclaimer, the term of this patent is extended or adjusted under 35 U.S.C. 154(b) by 666 days.

(21) Appl. No.: 12/503,772

(22) Filed: Jul. 15, 2009

(65) Prior Publication Data

US 2011/0015989 A1 Jan. 20, 2011

(51) Int. Cl.

| | |
|---|---|
| H04N 7/10 | (2006.01) |
| H04N 21/81 | (2011.01) |
| G06Q 30/02 | (2012.01) |
| H04N 21/258 | (2011.01) |
| H04N 21/262 | (2011.01) |
| H04N 21/442 | (2011.01) |
| H04N 21/658 | (2011.01) |
| G06Q 30/00 | (2012.01) |

(52) U.S. Cl.
CPC ............ *H04N 21/812* (2013.01); *G06Q 30/02* (2013.01); *G06Q 30/0244* (2013.01); *G06Q 30/0254* (2013.01); *H04N 21/25883* (2013.01); *H04N 21/26241* (2013.01); *H04N 21/44213* (2013.01); *H04N 21/6582* (2013.01)
USPC ......... 725/34; 725/35; 705/14.49; 705/14.72; 705/14.43

(58) Field of Classification Search
None
See application file for complete search history.

(56) References Cited

U.S. PATENT DOCUMENTS

| | | | |
|---|---|---|---|
| 4,905,080 | A | 2/1990 | Watanabe et al. |
| 5,373,315 | A | 12/1994 | Dufresne et al. |
| 5,481,294 | A | 1/1996 | Thomas et al. |
| 5,497,185 | A | 3/1996 | Dufresne et al. |
| 5,793,409 | A | 8/1998 | Tetsumura |
| 5,812,642 | A | 9/1998 | Leroy |
| 5,974,299 | A | 10/1999 | Massetti |
| 6,029,045 | A | 2/2000 | Picco et al. |
| 6,088,722 | A | 7/2000 | Herz et al. |
| 6,202,210 | B1 | 3/2001 | Ludtke |
| 6,463,585 | B1 | 10/2002 | Hendricks et al. |
| 6,467,089 | B1 | 10/2002 | Aust et al. |
| 6,647,548 | B1 | 11/2003 | Lu et al. |
| 6,681,393 | B1 | 1/2004 | Bauminger et al. |

(Continued)

OTHER PUBLICATIONS

U.S. Appl. No. 11/387,129, filed Mar. 16, 2006, MacHardy.

*Primary Examiner* — Chris Parry
(74) *Attorney, Agent, or Firm* — Gazdzinski & Associates, PC

(57) ABSTRACT

Methods and apparatus for identifying, distributing, and/or utilizing data regarding audience qualities within an advertisement management system. In one embodiment, the methods and apparatus of the present invention provide a technique for classifying data collected about an audience, and creating and grouping qualifiers to those classifications. Methods and apparatus for managing an advertising inventory via a management system, and using the aforementioned audience data, are also disclosed. The inventory is defined in one variant by predicted secondary content insertion opportunities and a particular audience of the primary content associated with the insertion opportunity. Subscriber privacy and anonymity is also optionally maintained via e.g., hashing or encrypting data relating to the CPE and/or subscriber, thus ensuring that audience data is not traceable to a specific user account.

20 Claims, 13 Drawing Sheets

(56) References Cited

U.S. PATENT DOCUMENTS

| | | | |
|---|---|---|---|
| 6,704,930 B1 * | 3/2004 | Eldering et al. | 725/36 |
| 7,039,928 B2 | 5/2006 | Kamada et al. | |
| 7,174,126 B2 | 2/2007 | McElhattan | |
| 7,197,472 B2 | 3/2007 | Conkwright et al. | |
| 7,222,078 B2 | 5/2007 | Abelow | |
| 7,356,751 B1 | 4/2008 | Levitan | |
| 7,363,643 B2 * | 4/2008 | Drake et al. | 725/34 |
| 7,457,520 B2 | 11/2008 | Rossetti | |
| 7,602,820 B2 | 10/2009 | Helms | |
| 7,720,432 B1 | 5/2010 | Colby et al. | |
| 7,730,509 B2 | 6/2010 | Boulet | |
| 8,042,131 B2 | 10/2011 | Flickinger | |
| 8,065,703 B2 | 11/2011 | Wilson | |
| 8,205,226 B2 * | 6/2012 | Ko et al. | 725/34 |
| 8,347,341 B2 | 1/2013 | Markley et al. | |
| 2002/0078444 A1 | 6/2002 | Krewin et al. | |
| 2002/0087975 A1 | 7/2002 | Schlack | |
| 2002/0087976 A1 | 7/2002 | Kaplan et al. | |
| 2002/0123928 A1 | 9/2002 | Eldering et al. | |
| 2002/0178445 A1 * | 11/2002 | Eldering et al. | 725/32 |
| 2003/0056217 A1 | 3/2003 | Brooks | |
| 2003/0101454 A1 * | 5/2003 | Ozer et al. | 725/42 |
| 2004/0133467 A1 * | 7/2004 | Siler | 705/14 |
| 2004/0148625 A1 * | 7/2004 | Eldering et al. | 725/34 |
| 2005/0034171 A1 | 2/2005 | Benya | |
| 2005/0039205 A1 | 2/2005 | Riedl et al. | |
| 2005/0060745 A1 | 3/2005 | Riedl | |
| 2005/0289588 A1 * | 12/2005 | Kinnear | 725/35 |
| 2006/0190336 A1 | 8/2006 | Pisaris-Henderson et al. | |
| 2006/0253584 A1 | 11/2006 | Dixon et al. | |
| 2006/0294259 A1 | 12/2006 | Matefi et al. | |
| 2007/0022459 A1 | 1/2007 | Gaebel, Jr. | |
| 2007/0217436 A1 | 9/2007 | Markley | |
| 2007/0244760 A1 | 10/2007 | Bodnar et al. | |
| 2008/0147497 A1 | 6/2008 | Tischer | |
| 2008/0263578 A1 * | 10/2008 | Bayer et al. | 725/9 |
| 2008/0313691 A1 | 12/2008 | Cholas et al. | |
| 2009/0030802 A1 * | 1/2009 | Plotnick et al. | 705/14 |
| 2009/0132346 A1 * | 5/2009 | Duggal et al. | 705/10 |
| 2009/0187939 A1 | 7/2009 | LaJoie | |
| 2009/0210899 A1 | 8/2009 | Lawrence-Apfelbaum et al. | |
| 2009/0319379 A1 | 12/2009 | Joao | |
| 2009/0320059 A1 | 12/2009 | Bolyukh | |
| 2010/0251304 A1 | 9/2010 | Donoghue | |
| 2010/0251305 A1 | 9/2010 | Kimble | |
| 2011/0016479 A1 | 1/2011 | Tidwell | |
| 2011/0016482 A1 | 1/2011 | Tidwell | |

* cited by examiner

METHODS AND APPARATUS FOR CLASSIFYING AN AUDIENCE IN A CONTENT DISTRIBUTION NETWORK

RELATED APPLICATIONS

This application is related to commonly owned U.S. patent application Ser. No. 12/503,749 filed on Jul. 15, 2009 and entitled "METHODS AND APPARATUS FOR EVALUATING AN AUDIENCE IN A CONTENT-BASED NETWORK" and to commonly owned U.S. patent application Ser. No. 12/503,710 filed on Jul. 15, 2009 and entitled "METHODS AND APPARATUS FOR TARGETED SECONDARY CONTENT INSERTION", now patented as U.S. Pat. No. 8,813,124, incorporated herein by reference in their entireties.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of computer-assisted data manipulation and analysis. Specifically, in one exemplary aspect, the invention relates to methods and apparatus for collection and classification of data regarding an audience in a content-based network such as a cable television or satellite network.

2. Description of Related Technology

"Nielsen Ratings" are a well known system of evaluating the viewing habits of cross sections of the population. When collecting Nielsen ratings, companies use statistical techniques to develop a sample population which is a cross section of a larger national population. Theoretically, the viewing habits of the sample population will mirror the larger population. The companies then measure the populations viewing habits to identify, among other things, what programs the population is watching as well as the time and frequency at which those programs are watched. This information is then extrapolated to gain insight on the viewing habits of the larger population. Historically, the Nielsen system has been the primary source of audience measurement information in the television industry. The Nielsen system, therefore, affects various aspects of television including inter alia, advertising rates, schedules, viability of particular shows, etc., and has been also recently expanded from measuring an audience of program content to measuring an audience of advertising (i.e., Nielsen ratings may be provided for advertisements themselves).

The Nielson system collects data regarding audiences via either (i) by asking viewers of various demographics to keep a written record of the television shows they watch throughout the day and evening, or (ii) by using "set meters," which are small devices connected to televisions in selected homes which electronically gather the viewing habits of the home and transmit the information nightly to Nielsen or a proxy entity over a connected phone line or other connection.

There are several disadvantages to the Nielsen approach. First, the sample of viewers selected may not be fairly representative of the population of viewers (or the subset of cable viewers) as a whole. For example, in a cable network comprising four million cable viewers, a sample of any 100,000 viewers may exhibit different average viewing habits than the averages associated with the other 3,900,000 cable viewers who are not in the sample.

Second, static delivery makes it difficult to precisely target an audience that is known to be in the market. For example, suppose that the ideal target for a sports car advertisement is the set of all consumers who like and would be interested in buying sports cars. If all that is known from Nielsen data is that 10% of the sample group has watched the auto-racing channel for over three hours in the last month, this may not perfectly correlate with set of consumers who like sports cars. This may be the case, for example, if there are some consumers who are in the market for sports cars but who never watch the auto racing channel, or if there are some viewers of the auto racing channel who have no interest in buying or owning sports cars. As such, patterns based on viewership data often imprecisely identify the desired audience.

Furthermore, the Nielson system is disadvantageously program-specific. Program-specific audience data collection is problematic from the standpoint that this program-coupled approach is only as good as the underlying demographic correlation model. For example, assuming a demographic of 18-30 year old females typically tune in to American Idol each broadcast (e.g., Monday at 8:00 pm), this same demographic may not have any interest in watching the program immediately preceding or following American Idol, and hence may tune away (or delay tuning to that channel until the start of America Idol).

Another disability of the Nielson approach is that it tends to aggregate data or results for given premises (e.g., households) as opposed to providing data for specific users of that premises. For example, the switching activity associated with a given set top box for a family of five represents switching activity for each member of that family (including perhaps viewing of cartoons for a child, teen-related programs for a teenager, and adult-related content for one or more adults). However, Nielsen systems are at present incapable of determining precisely which member(s) of that household viewed which programs or advertisements. Hence, the data obtained using Nielsen techniques is somewhat of an amalgam of the data for individual users, and various combinations thereof.

For media content providers such as cable and satellite companies and the like, a major issue is how to more accurately target population segments for advertising campaigns based on particular characteristics of an audience, opportunities for insertion (or replacement) of an advertisement, and other factors. It is most desirable for advertisers to have advertisements for products that are targeted to a particular demographic to be viewed by that demographic.

Therefore, there is a need for improved methods and apparatus which do not require or rely solely on population sampling or trend analysis based on a sample population, in order to more accurately generate and analyze audience measurement data. Such improved methods and apparatus would ideally be able to gather audience information in real-time or near-real time with associated viewership actions of actual viewers. Exemplary methods would be able to obtain audience information directly from customer's premises equipment (i.e. set top boxes, cable modems etc.), for each individual box or even on a per-user basis where possible, thereby allowing a content provider to gather specific information in large quantities across a broad geographical area. Ideally, these methods and apparatus would be able to monitor or use data from multiple sources of content to which viewership behavior relates, and also maintain subscriber anonymity or privacy (i.e., no use of personally identifiable information).

These features would also be provided leveraging substantially extant network infrastructure and components, and would be compatible with a number of different client device and delivery systems including both wired and wireless technologies.

SUMMARY OF THE INVENTION

The present invention addresses the foregoing needs by providing, inter cilia, methods and apparatus adapted to increase the effectiveness of advertising or promotional content to be delivered over a network to one or more network devices and associated users.

In one aspect of the invention, an advertising management apparatus for use in a content delivery network is disclosed. In one embodiment, the apparatus comprises: computerized apparatus comprising a processor and at least one storage device in data communication therewith, the at least one storage device storing a computer program. The program is configured to, when executed: access first data regarding one or more target audience qualities of an advertisement; access second data regarding one or more audiences at an insertion opportunity; and generate data relating to the quality of a match between the first data and the second data.

In one variant, the computerized apparatus comprises a computer or server disposed within an extant advertising insertion system of the network.

In another variant, the second data comprises advertising inventory, the inventory comprising information relating to: (i) the insertion opportunity; and (ii) an audience associated with the placement opportunity. For example, the information relating to the audience of the second data is obtained from at least one of: (i) records relating to one or more subscribers of the network maintained by an operator of the network, or (ii) data obtained by the operator of the network via respective CPE of the one or more subscribers.

In another aspect of the invention, the computer program is further configured to, when executed, select one or more advertisements for insertion at the opportunity based at least in part on the data relating to the quality of the match. The generation of the data regarding the quality of the match comprises e.g., determining, for a selected delivery platform, a projection of future demand for delivery of content via the delivery platform; and the selection of the one or more advertisements is based at least in part on the projection. The projection can be based on any number of techniques, such as e.g., a linear regression of historical usage data of the delivery platform.

In yet another variant, the selection is based at least in part on a relationship between the subject matter of the one or more advertisements and that of at least a portion of primary content into which the one or more advertisements are being inserted.

The selection can be based also (or in the alternative) on one or more advertising campaign goals provided by an advertiser, the advertising campaign comprising a plurality of advertisements.

In a second aspect of the invention, a method of creating and maintaining an advertisement campaign is disclosed. In one embodiment, the method comprises: developing one or more descriptive data files for each of a plurality of advertisements, the advertisements being associated with a single advertiser, the descriptive data files indicating: (i) one or more characteristics of a target audience thereof, and (ii) a relative importance of each of the one or more characteristics; creating one or more policies for the presentation of each of the plurality of advertisements, the policies based at least in part on a delivery platform for the presentation and a level of service of the advertiser; utilizing the descriptive data files and the policies to estimate a rate of placement of the individual ones of the plurality of advertisements with respect to a predetermined set of upcoming placement opportunities; generating a plurality of records documenting instances of placement of each of the plurality of advertisements; and utilizing the plurality of records to determine whether placement of each of the plurality of advertisements meets a predetermined criterion.

In one variant, if the criterion is not met, the method comprises modifying the relative importance of individual ones of the one or more characteristics or one or more of the policies.

In another variant, the method further comprises utilizing the plurality of records to charge the advertiser.

In yet another variant, the level of placement is based at least in part on a subscription level of the advertiser.

In a further variant, the instances of placement of each of the plurality of advertisements is based at least in part on configuration requirements of each of the plurality of advertisements.

In a third aspect of the invention, an apparatus for managing a plurality of secondary content is disclosed. In one embodiment, the apparatus comprises: a data interface adapted to receive a plurality of descriptive data regarding a plurality of secondary content; an user interface adapted to enable a user to establish one or more rules for selection of individual ones of the plurality of secondary content; and a processor adapted to run at least one computer program. The program is configured to: determine, based at least in part on the descriptive data and the one or more rules, a likelihood of an occurrence of placement opportunities for which individual ones of the plurality of secondary content may be selected; and if the occurrence occurs outside of a predetermined range, adjust the descriptive data or the one or more rules.

In one variant, the program is further adapted to determine one or more aspects of a system configuration necessary for presentation of each of the plurality of secondary content. The system configuration information can further be utilized in e.g., determining the likelihood of an occurrence.

In another variant, the determination of one or more aspects of a system configuration necessary for presentation of each of the plurality of secondary content comprises: (i) determination of the type of the secondary content, and (ii) determination of whether the type of the secondary content is acceptable for use with a delivery platform selected for delivery of primary content into which the secondary content is to be inserted.

In yet another variant, the apparatus further comprises an interface for providing an estimate of the occurrence to a secondary content provider associated with the plurality of secondary content, and/or an interface for receiving information regarding an audience of upcoming placement opportunities, the information being used by the computer program in determining the occurrence.

In a fourth aspect of the invention, a method of doing business in a content-based network is disclosed. In one embodiment, the method comprises: obtaining data regarding a plurality of secondary content; determining whether the plurality of secondary content is compatible with a system configuration; establishing one or more rules for selection of individual ones of the plurality of secondary content; estimating a frequency of selection of the individual ones of the plurality of secondary content; and providing the estimate of the frequency to a secondary content provider associated with each of the individual ones of the plurality of secondary content.

In one variant, the data regarding the plurality of secondary content comprises information regarding one or more characteristics of a target audience thereof. Each of the plurality of secondary content is for example associated with one or more descriptive data files, the data files comprising the data regarding each of the plurality of secondary content.

In another variant, the act of determining comprises determining if the secondary content is compatible based at least in part on a geographic location of a recipient thereof.

In yet another variant, the act of determining comprises determining a type of secondary content to be presented based at least in part on an intended delivery platform.

In a further variant, the one or more rules for selection comprise MSO-established rules, and wherein a set of rules are applied to more than one of the plurality of secondary content, the more than one of the plurality of secondary content comprising secondary content relating to the same advertiser.

In another variant, the method further comprises presenting a selected one of the plurality of secondary content to one or more users of the network. A record relating to the presentation of the individual ones of the plurality of secondary content can also be generated if desired.

In still another variant, the act of estimating a frequency of selection is based at least in part on: (i) the data regarding the plurality of secondary content, (ii) data regarding an audience of at least one upcoming insertion opportunity, and (iii) the one or more rules.

In another variant, the method further comprises, if the frequency of selection is determined to be insufficient, making one or more adjustments to the data regarding the secondary content or the one or more rules. The one or more adjustments to the data regarding the secondary content comprises e.g., adjusting a weight or variance associated with individual ones of a plurality of characteristics of a target audience of the secondary content.

In a fifth aspect of the invention, a method of implementing an advertising campaign is disclosed. In one embodiment, the method comprises: receiving first information regarding one or more parameters of the campaign; receiving second information regarding one or more placement opportunities for advertisements; receiving third information regarding an audience associated with the one or more placement opportunities; and selecting one or more advertisements that: (i) are a match for the audience; (ii) are compatible with the placement opportunity; and (iii) are consistent with the one or more parameters.

In one variant, receiving second information regarding one or more placement opportunities and the third information regarding the audience comprises receiving an advertising inventory data structure having both the second and third information contained therein.

In another variant, selecting one or more advertisements that are a match for the audience comprises selecting one or more advertisements whose target audience has at least a first level of similarity to the audience associated with the one or more placement opportunities.

In yet another variant, the selecting one or more advertisements that are compatible with the placement opportunity comprises selecting one or more advertisement that can fit into a time slot associated with the opportunity, and that are compatible with a delivery platform associated with the opportunity.

In a sixth aspect of the invention, computer readable apparatus is disclosed. In one embodiment, the apparatus comprises a medium having one or more computer programs stored thereon, the one or more programs adapted to analyze data regarding advertising opportunities and associated audiences in light of an advertiser's or network operator's advertising campaign goals, and select one or more advertisements for insertion based on the analysis.

In a seventh aspect of the invention, a method of advertising management for use in a content distribution network is disclosed. In one embodiment, the method comprises receiving first information regarding a weight or variance to be applied to at least one demographic criteria to be met by a first audience of an advertisement at an advertising management apparatus within the content distribution network, receiving second information regarding at least one parameter relating a second audience to an opportunity for insertion of one or more advertisements at the advertising management apparatus, utilizing the advertising management apparatus to generate first data related to a quality of a match between the first information and the second information, the advertising management apparatus adjusting the weight or variance to be applied to the at least one demoaphic criteria to be met by the first audience based at least in part on the first data related to the quality of the match, and utilizing at least the adjusted weight or adjusted variance to generate second data related to the quality of the match.

In an eighth aspect of the invention, a method of managing advertising within a network is disclosed. In one embodiment, the method comprises accessing first information regarding a plurality of placement opportunities for advertisements using a management entity of the network, accessing second information regarding an audience associated with individual ones of the plurality of placement opportunities using the management entity of the network, accessing third information identifying a target audience associated with one or more advertisements within a campaign using the management entity of the network, comparing a number of instances where the target audience matches the audience associated with individual ones of the plurality of placement opportunities to an advertiser provided threshold number, and when it is determined that the number of instances does not meet or exceed the threshold number, the management entity of the network adjusting one or more aspects of the target audience associated with the one or more advertisements within the campaign.

These and other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
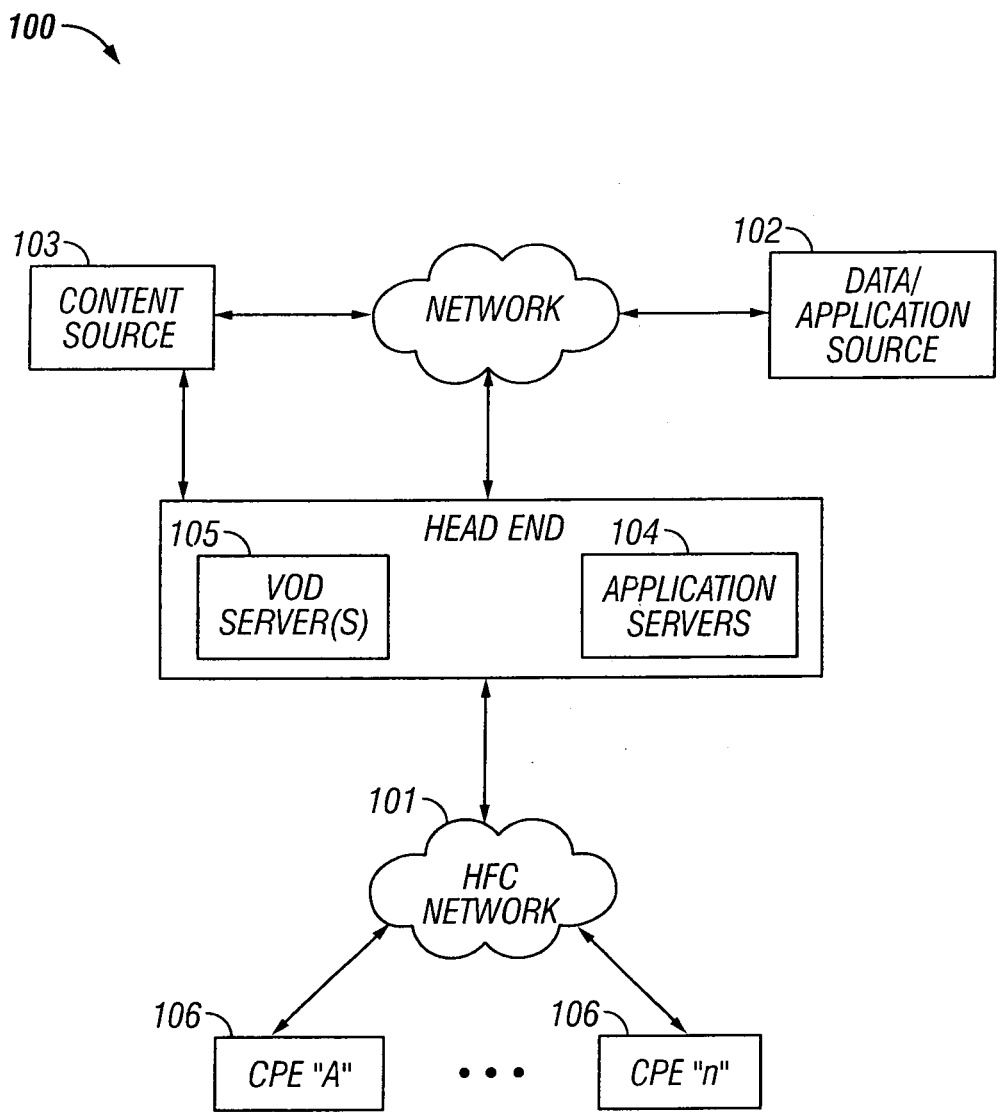
FIG. 1 is a functional block diagram illustrating an exemplary HFC cable network configuration useful with the present invention.

Reference is now made to the drawings, wherein like numerals refer to like parts throughout.

As used herein, the term "advertisement" refers to (without limitation) advertising, promotions, info-mercials, related segments or special features (e.g., the making of "X", where X is the primary content), as well as other types of secondary content.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or Motorola ROKR, and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "consideration" refers without limitation to any payment, compensation, bargain, barter, release, option, or other arrangement wherein something of actual, perceived or potential future value (whether by an objective or subjective standard) is given, assigned, transferred or exchanged. For example, one form of consideration is a monetary payment. Another comprises an exchange of services. Yet another comprises release from an obligation or debt. Still another form comprises a subscription or installment plan. Yet a further form comprises providing a limited time option Myriad other forms of consideration will be appreciated by those of ordinary skill given the present disclosure.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors; SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, 16QAM, 64QAM, 256QAM, etc.) depending on details of a cable network. A QAM may also refer to a physical channel modulated according to the schemes.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

As used herein, the term "wireless" means any wireless signal, data, communication, or other interface including without limitation WiFi (such as IEEE-Std. 802.11 or related standards including 802.11 a/b/g/n), Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention discloses methods and apparatus for identifying, creating and distributing data relating to audience or viewer qualities to an advertisement management system and an advertisement decision maker. An advertising "inventory" is created and related to audiences by combining the audience data with advertisement placement opportunities. The present invention further includes methods and apparatus for measuring and managing such advertising inventory via e.g., a network-based management system. Measurement provides inter alia an accounting of sold inventory, and measurement accumulated over time allows the value of the inventory to be realized. These methods and apparatus give a network operator or other entity the ability to offer new inventory with a high degree of confidence that booked orders will meet their audience penetration or "impression" goals or targets.

In one embodiment, the apparatus and methods discussed herein are further adapted to manage advertising campaigns for one or more advertisement/promotional providers in order to, for example, increase advertising or associated sales revenue for an MSO, as well as to increase the likelihood a particular advertiser will reach its targeted audience as precisely as possible (and within any limitations of an advertiser-MSO defined relationship).

Subscriber privacy and anonymity is also optionally maintained via e.g., hashing or encrypting data relating to the CPE and/or subscriber, thus ensuring that stored data is not traceable to a specific user account. In alternative embodiments, only information designated by a consumer is eligible for content collection and/or analysis. In this manner, subscriber privacy is effectively safeguarded, and user control of their private information (including for example preferences or user profile) is protected as well.

DETAILED DESCRIPTION OF EXEMPLARY EMBODIMENTS

Exemplary embodiments of the audience classification apparatus and methods of the present invention are now described in detail. While these exemplary embodiments are described in the context of the aforementioned hybrid fiber coax (HFC) cable architecture having a multiple systems operator (MSO), digital networking capability, and plurality of client devices/CPE, the general principles and advantages of the invention may be extended to other types of networks and architectures, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over satellite or millimeter wave-based networks having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

Also, while certain aspects are described primarily in the context of the well known IP or Internet Protocol (described in, inter alia, RFC 791 and 2460), it will be appreciated that the present invention may utilize other types of protocols (and in fact bearer networks to include other internets and intranets) to implement the described functionality.

Bearer Network Architecture—

FIG. 1 illustrates a typical content-based network configuration with which the apparatus and methods of the present invention may be used. The various components of the network 100 include (i) one or more data and application origination points 102; (ii) one or more content sources 103, (iii) one or more application distribution servers 104; (iv) one or more VoD servers 105, and (v) consumer premises equipment (CPE) 106. The distribution server(s) 104, VoD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VoD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VoD-based application, gaming application, or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VoD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the servers 104, 105) that can be accessed by a distribution server 104 or VOD server 105. Exemplary embodiments of a "converged" CPE (i.e., CD) of the invention are also described subsequently herein.

Figure 1A:
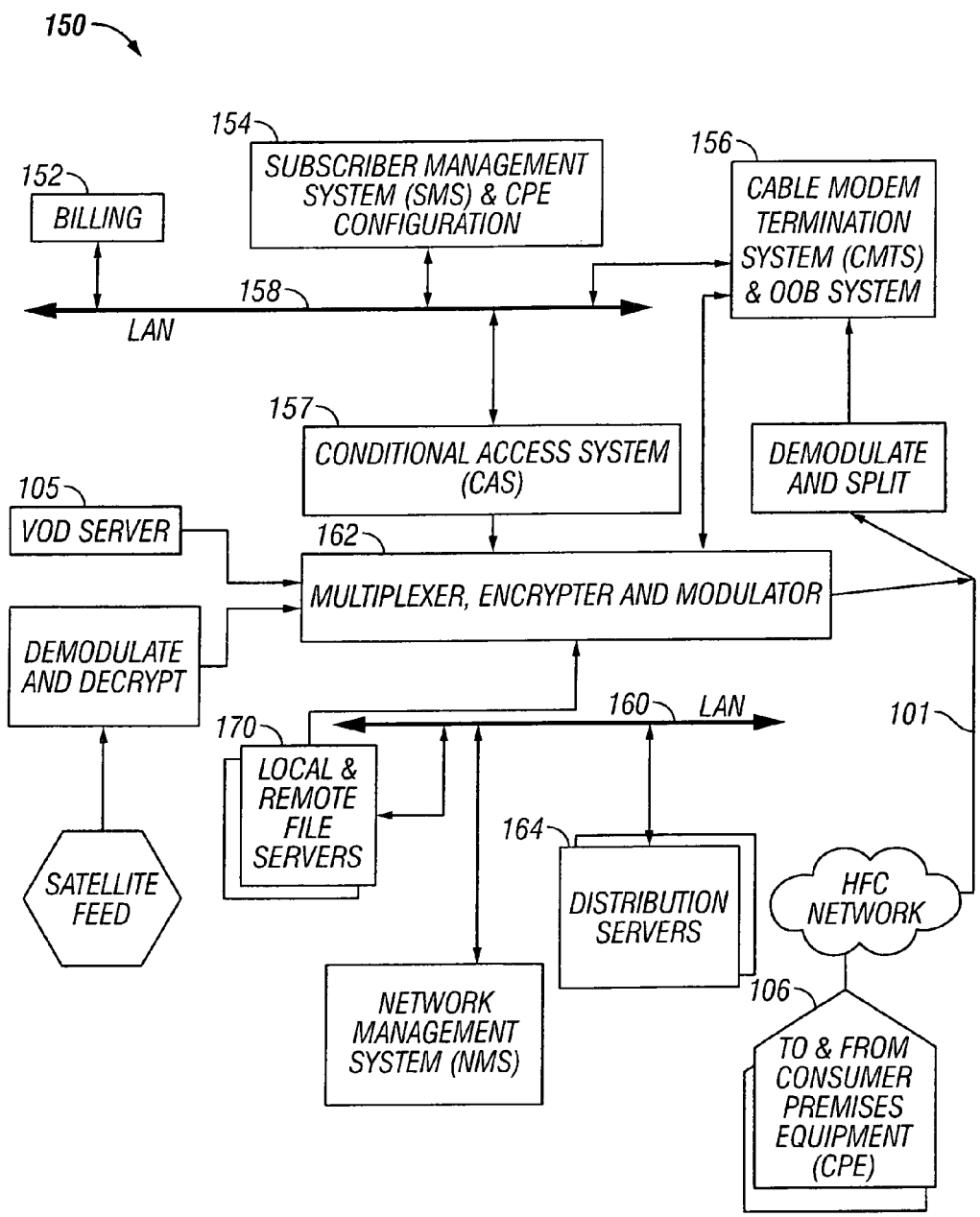
FIG. 1a is a functional block diagram illustrating one exemplary HFC cable network headend configuration useful with the present invention.

Referring now to FIG. 1a, one exemplary embodiment of headend architecture useful with the present invention is described. As shown in FIG. 1a, the headend architecture 150 comprises typical headend components and services including billing module 152, subscriber management system (SMS) and CPE configuration management module 154, conditional access system (CAS) 157, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs (FIG. 1b) via a variety of interposed network components.

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. patent application Ser. No. 11/048,334, entitled "Apparatus and Methods for Multi-Stage Multiplexing in a Network" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed-forward" mechanisms for transferring information between multiplexing stages.

Content (e.g., audio, video, data, applications, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
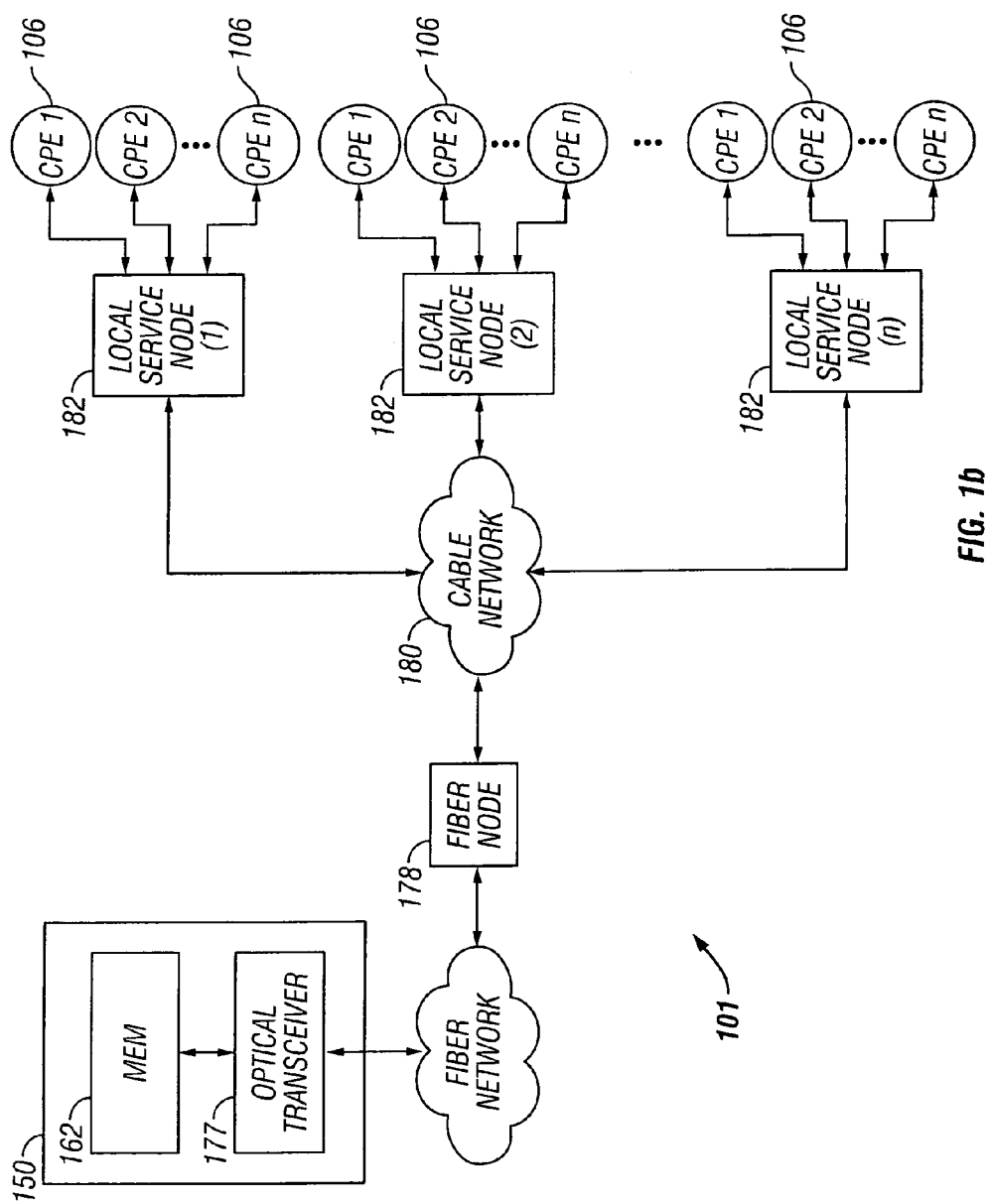
FIG. 1b is a functional block diagram illustrating one exemplary local service node configuration useful with the present invention.
Figure 1C:
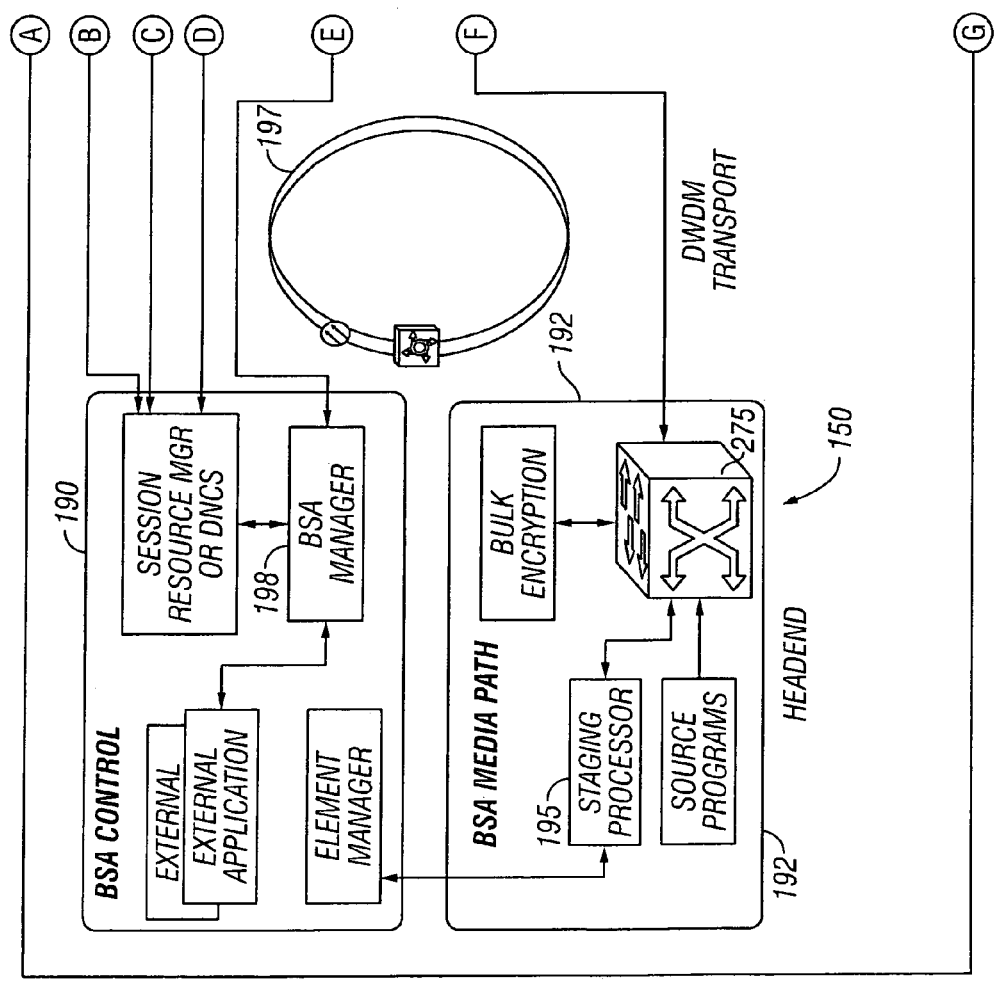
FIG. 1c is a functional block diagram illustrating one exemplary broadcast switched architecture (BSA) network useful with the present invention.
Figure 1C:
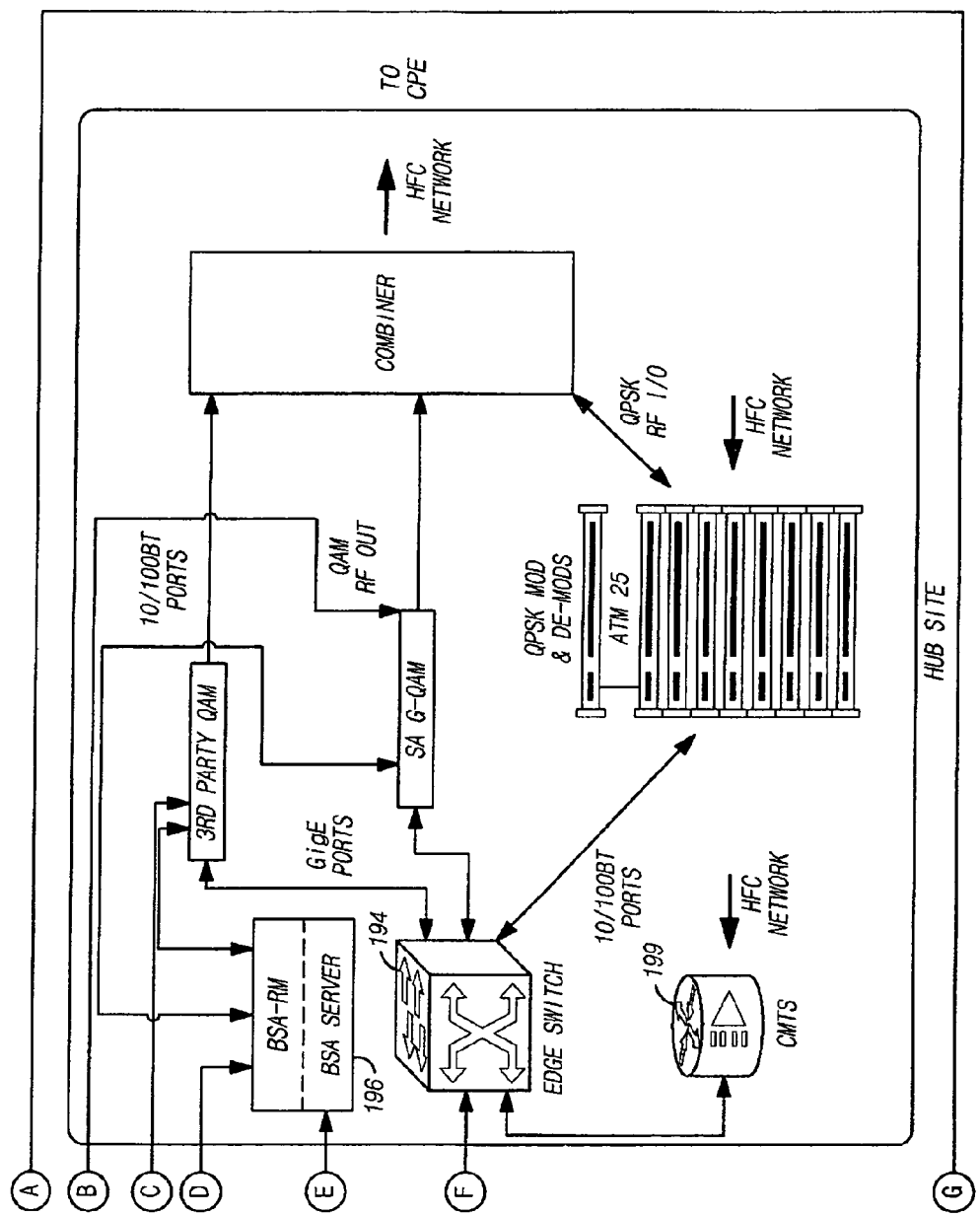

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

FIG. 1c illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192 (including e.g., a staging processor 195 and bulk encryption); these element cooperating to control and feed, respectively, downstream or edge switching devices 194 at the hub site which are used to selectively switch broadcast streams to various service groups. A BSA server 196 is also typically disposed at the hub site, and implements functions related to switching 275 and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique for Effectively Providing Program Material in a Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a-1c can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over JP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable or other modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs (or CD). The IP packets are typically transmitted on RF channels that are different than the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Audience Classification System—

Figure 2:
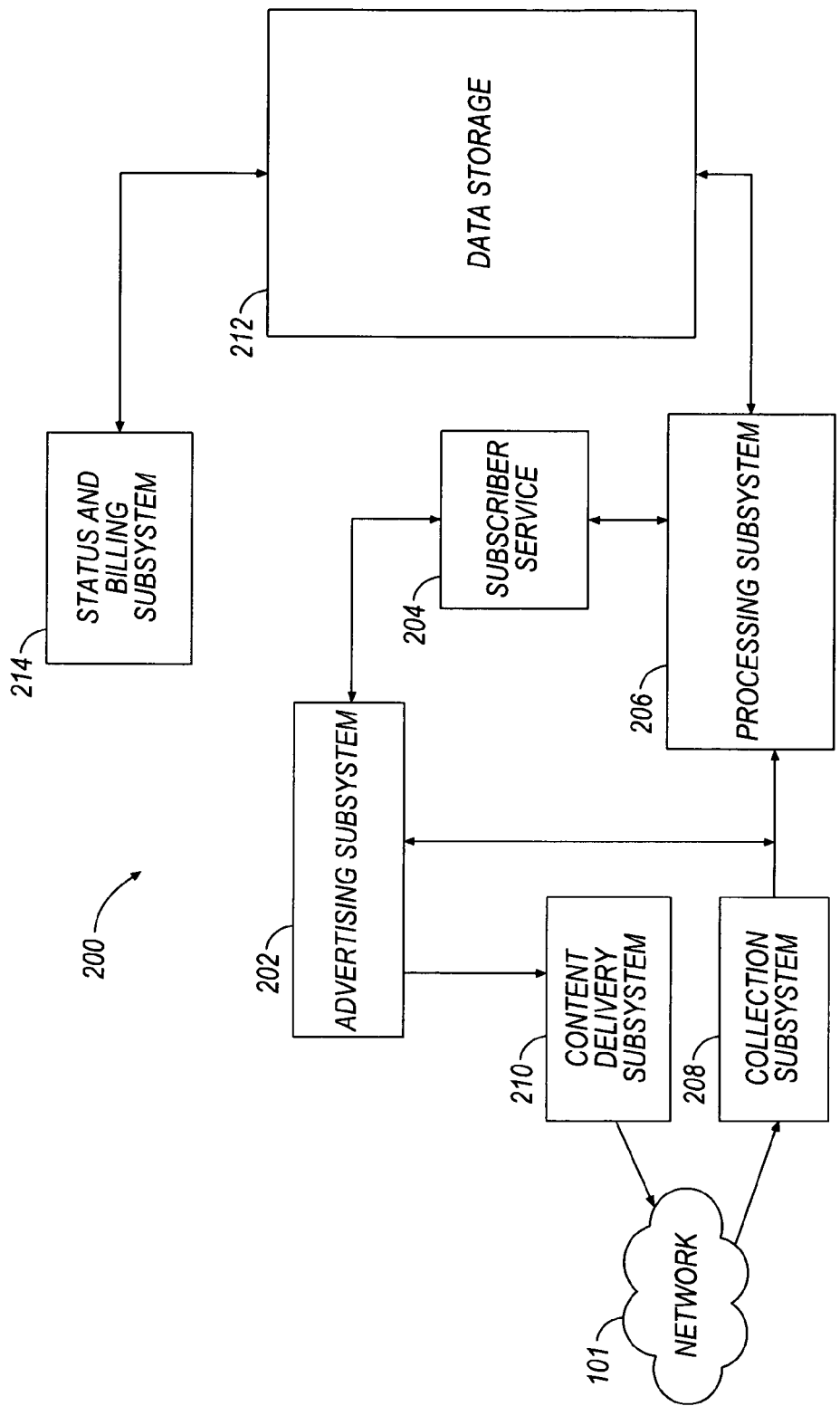
FIG. 2 is a high-level block diagram illustrating one embodiment of a audience classification system according to the present invention.

Referring now to FIG. 2, one embodiment of the network architecture specifically implementing the audience classification and targeted advertisement/promotional delivery functions of the invention is shown and described. The system 200 of FIG. 2 is in the present embodiment disposed substantially at one or more cable or satellite network headends or distribution facilities, although it will be recognized that this is in no way a requirement, and in fact the components may be distributed among various different physical locations (and connected via network for example) as desired. Moreover, different cable or satellite system headends may share components between them, and/or have multiple ones of components installed for e.g., redundancy/failover protection, different tasking or service, etc.

As shown in FIG. 2, the system 200 comprises an advertising subsystem 202, subscriber information service 204, processing subsystem 206, data collection subsystem 208, and content delivery subsystem 210, in operative communication as shown. A data storage subsystem 212 and status and billing subsystem 214 are also in communication with the processing subsystem 206. The content delivery subsystem 210 and data collection subsystem 208 are in communication with the HFC distribution network 101 to deliver content and receive data from user equipment (e.g., CPE 106) such as via an out-of-band upstream RF channel, although it will be appreciated that other approaches may be used, including for example delivery via an upstream DOCSIS channel, or even a whole separate transport such as a wireless or other IP network (not shown).

Figure 2A:
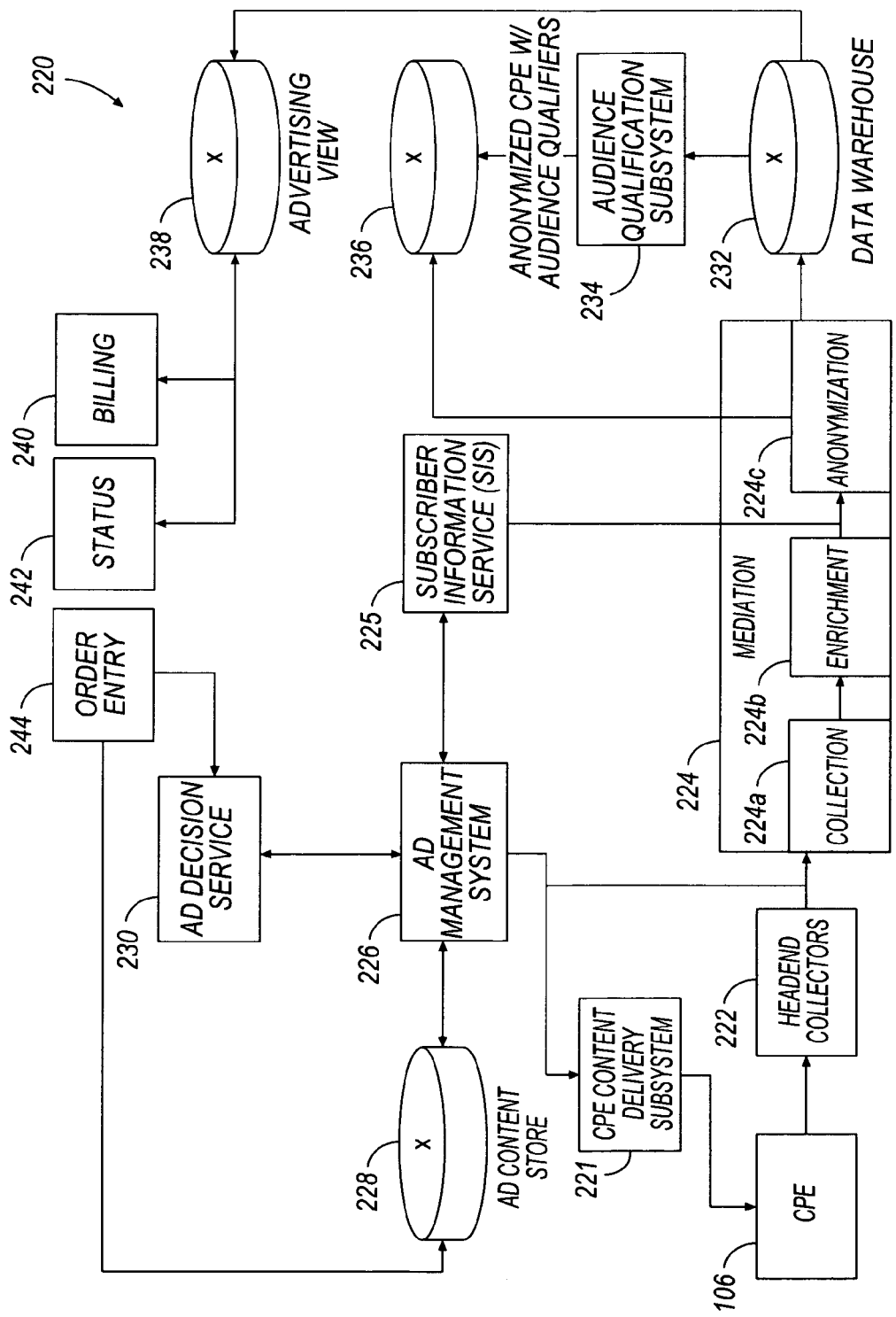
FIG. 2a is a functional block diagram illustrating an exemplary cable network implementation of the audience classification system of FIG. 2.

The operation and function of the foregoing subsystems and components is illustrated in detail with respect to one exemplary implementation (see discussion of FIG. 2a below), although it will be appreciated that the embodiment of FIG. 2a is merely one possible architecture for implementing the system 200 of FIG. 2. Moreover, various of the subsystems and components shown in FIG. 2 can be combined with others, or functions performed thereby distributed across different functional (e.g., hardware or software) entities already within the content delivery network.

Referring now to FIG. 2a, an exemplary implementation of the audience classification system according to FIG. 2 described above is given. The system 220 enables data regarding an audience to be collected and information to be derived therefrom in order to categorize or group an audience. The categories and/or groups may be used for, inter alia, generating an inventory as discussed in co-owned, U.S. patent application Ser. No. 12/503,749 entitled "METHODS AND APPARATUS FOR EVALUATING AN AUDIENCE IN A CONTENT-BASED NETWORK" filed on Jul. 15, 2009 and incorporated herein by reference in its entirety and/or targeting advertisements. This "inventory" in one embodiment comprises a placement opportunity along with a particular audience watching that opportunity.

As illustrated, the audience classification system 220 of FIG. 2a generally comprises a content delivery subsystem 221 adapted to provide content to the CPE 106. The content delivery subsystem 221 may, in one embodiment, comprise a local node 182 such as that described above with respect to FIG. 1b. Alternatively, the content delivery subsystem 221 may comprise an entity separate from, yet in communication with the above-described content-transmitting entities. The content delivery subsystem 221 is adapted to delivery "primary" and "secondary" content to a CPE 106. As described above, primary content (e.g., movies, broadcast programs, etc.) is delivered to the CPE 106 from various content sources 103. Secondary content (such as advertising or promotional content), in the illustrated embodiment, is originated from an advertisement management system (ADM) 226.

Advantageously, the methods and apparatus of the present invention can be used with any number of different advertising insertion or splicer architectures, whether analog, digital or hybrid in nature. See, for example, co-pending and co-owned U.S. patent application Ser. No. 10/662,776 filed Sep. 15, 2003 entitled "SYSTEM AND METHOD FOR ADVERTISEMENT DELIVERY WITHIN A VIDEO TIME SHIFTING ARCHITECTURE" (published as patent publication No. 20050060745 on Mar. 17, 2005), which is incorporated by reference herein in its entirety, for exemplary advertising insertion and splicer apparatus and methods in the context of, e.g., networked digital video recorder (nDVR) or VoD delivery paradigms.

The ADM 226 selects individual ones of a plurality of secondary content for delivery to individual ones of the CPE 106 from a secondary content store 228. The ADM 228 may, in one embodiment, be adapted to comply with the requirements set forth in the Society of Cable Telecommunications Engineers SCTE 130-1 and SCTE 130-3 Digital Program Insertion—Advertising Systems Interfaces standards, which are incorporated herein by reference in their entirety. Advertising content is placed on the content store 228 by a source of the advertising (not shown). In one embodiment, the ADM 226 is in communication with an Advertisement Decision Service 230 which determines individual ones of the plurality of secondary content from the content store 228 to deliver to the CPE 106 (via the content delivery subsystem 221) based in part on data collected from a headend collecting entity 222.

It is noted that although only one headend collector 222 is depicted in FIG. 2a, the audience classification system 220 may comprise, in one embodiment, several headend collectors 222 belonging to various MSOs. Alternatively, the headend collector 222 may comprise one or several headend collectors 222 of the same MSO.

As illustrated in FIG. 2a, the headend collecting entity 222 receives information from the CPE 106 regarding actions taken thereon with respect to content (whether secondary or primary). For example, the headend collecting entity 222 may receive information about individual user activities including, inter alia, tuning events (such as viewing a broadcast program or purchasing a VOD program), manipulation events or "trick mode" operations (such as fast forwarding, rewinding, etc.), recording events (e.g., DVR or nPVR commands), events which relate to changes in the system's configuration (for example, changes to the program channel map or changes to the services a particular CPE 106 receives), and/or "heartbeat" events such as those indicating whether a particular CPE is powered up or otherwise active/functional.

The headend collecting entity 222 may be further adapted to collect information regarding geographic location, demographic and/or psychographic information, system capabilities, the size of the audience for any particular program, etc. of the CPE 106 in communication therewith. Although only one CPE 106 is illustrated, it will be appreciated that the headend collecting entity 222 may be adapted to receive and process information from a plurality of CPE 106. Certain information regarding the CPE 106 may further be collected from the Electronic Programming Guide (EPG), web portals, cell phone usage, Customer Relationship Management Systems (CRM), billing systems, census data, other advertising networks, and other third party sources (such as e.g., Canoe Ventures, etc.).

In another embodiment, the headend collecting entity 222 may also receive metadata regarding secondary content transmitted to the CPE 106. For example, the ADM 226 may transmit secondary content to the content delivery subsystem 221 (discussed above) and simultaneously send metadata regarding the secondary content to the headend collecting entity 222. Alternatively, the headend collecting entity 222 may be provided with metadata regarding all of the secondary content stored on the content store 228 before the secondary content is transmitted to the CPE 106.

In another embodiment, a content information service (CIS), subscriber information service (SIS) and/or placement opportunity information service (POIS) communicate with the ADM 226 to provide metadata and other information thereto. The CIS is an interface which describes a logical service, it may be run on any entity managing metadata or on an entity in communication with a second entity containing metadata describing the content. The CIS sources metadata to consumers (via the ADM and ADS). The CIS does not define how to move the content around, however a separate CIS implementation may be given to provide such functionality.

The headend collecting entity 222 translates the metadata to a content record describing the content to which it relates. Generally speaking, "metadata" comprises extra data not typically found in typical content (or at least not visible to the users of the network), such as for example that rendered in an XML or other such format. For each component of the content (e.g., video/audio), one or more metadata files are associated that specify the relevant search terms or primitives for that content. This metadata can be provided with the content from its source or provider (e.g., a network studio or station or the like), or alternatively added by the MSO. Alternatively, portions of the metadata can be added by multiple entities, and/or editing of another entity's metadata performed. Various permutations and mechanisms for generating, adding and editing metadata will be recognized by those of ordinary skill, and hence are not described in detail herein.

It is also appreciated that in yet another embodiment, the headend collecting entity 222 may be adapted to further receive metadata regarding primary content transmitted to the CPE via the content delivery subsystem 221 or other content providing entity (such as those disclosed above with respect to FIGS. 1a-1c). Such metadata may be useful for a variety of reasons including for example obtaining a description of a particular primary content element so that appropriate advertising can be matched thereto; see e.g., co-owned and co-pending U.S. patent application Ser. No. 12/284,757 filed Sep. 24, 2008 entitled "Methods and Apparatus for User-Based Targeted Content Delivery" which is incorporated herein by reference in its entirety, for one exemplary use of such primary metadata in connection with targeted advertising.

The headend collecting entity 222 passes the collected customer information (e.g., user preferences, activity, demographics, etc.) and metadata regarding content (primary and/or secondary) to the data collection portion 224a of the processing (e.g., mediation) entity 224. The mediation entity 224 is adapted to receive and process the collected information from disparate sources (such as e.g., tuning data from the SDV server, VOD, DVR or click stream data from the STB, etc.). In some cases the data may be collected in real-time or near real-time. In one embodiment, the mediation entity 224 synthesizes the information at an enrichment portion 224b; such synthesis may include e.g., identification of one or more patterns of interest (PI) in the aggregate data collection. This identification may be accomplished via any one of the plurality of methods for mining and examining data sets known in the arts. The PI's are theoretically arbitrary, and depend on business needs or research discovery.

A salient feature of a PI is the ability to reproduce the pattern, and in turn generate basic questions to be asked and answered of that PI (e.g., given a PI of "has Internet and video", one would want to know given perhaps some other constraints, "how many of those are present?" or given this subscriber or set of subscribers (audience) is there a "match"). In other words, PI's are mechanisms for identifying from a large population of CPE reporting data on a near real-time (or real-time) basis, a relatively small subset of the CPE which exhibit a particular desired behavior. For example, PI's may indicate from among all of the CPE in a market only the ones which are doing or have performed an action to receive a specific commercial; the particular action performed which caused delivery of the commercial in this example is the PI. A PI may be expressed as an arbitrarily complex Boolean Expression against the data collected. Suppose for example set-top tuning data is being collected, a possible PI may be those households for which one STB was tuned to Fox News™ in prime time for at least one hour per day over a week long period. The PI may then be applied to the entire population of STBs, thereby extracting only those STBs that, over the last week have been Tuned to Fox News for at least one hour per day. The identified STBs are then associated to the household to which they belong in an anonymous manner.

In another example, suppose a baby food advertiser seeks to advertise in households where expecting mothers are viewing. In this instance, a relevant PI may be those (anonymous) households with STBs that had relatively less tune-away events during commercials for pregnancy tests.

The patterns of interest (PI's) may relate to only a few of the plurality of CPE 106 providing data to the headend collectors 222 and mediation entity 224. However, if a predetermined number of CPE 106 share a given pattern of interest, that pattern of interest may then be expressed as an audience qualifier. An audience qualifier is a Boolean expression (e.g., has HSD, etc.) with an arbitrarily complex set of Boolean expressions joined together. In theory an audience qualifier may be used to express literally any PI. In other words, the system is triggered to understand that there is an "audience" sharing the pattern of interest. As will be discussed in greater detail below, the audience qualifier characterized by the reproducible pattern of interest is then further categorized into one or more classifications based on the collected data. Exemplary classifications include but are not limited to psychographic variables (e.g., "prefers watching mysteries", "likely to purchase a laptop", etc.), geographic location (e.g., "within the 80027 zip code", "currently driving down I-70", etc.), demographic makeup (e.g., "age 30-35", "income $50K-$70K", etc.), or other characteristic (e.g., Claritas PRIZM code, other market segmenting service code, etc.).

Classified audience qualifiers can therefore be traced to patterns of interest, and help determine the "reach" of the audience (e.g., which and how many CPE have the given classification). For example, one pattern of interest may be watching a particular program every Wednesday night; this type of pattern of interest may be determined from the metadata regarding primary content and user activity at the CPE 106. If the data collected indicates that a predetermined threshold of CPE 106 are tuning to that same program every Wednesday, watching the program may then be considered an audience qualifier. The enrichment portion 224b of the mediation entity 224 may then classify the audience qualifier by e.g., age, in order to determine for example that the vast majority of people watching the program every Wednesday night are within the 18-25 year old age range.

Once audience qualifiers have been created and characterized, a service such as the Subscriber Information Service (SIS) 225 described by the Society of Cable Telecommunications Engineers in SCTE 130-1 and SCTE 130-6 Digital Program Insertion—Advertising Systems Interfaces standards referenced above (see inter alia, Part 6), may be used to distribute the audience qualifiers to other entities such as the ADM 226, advertisement decision service (ADS) 230.

The enrichment portion 224b of the mediation entity 224 may be further adapted to "enrich" collected audience data by the insertion of associated data elements. In other words, processing is performed and/or additional data is added so as to enhance or increase the value of the data to one or more user or downstream entities. For instance, in one embodiment, event information is coupled to user specific information, thus the enrichment portion 224b correlates the CPE's 106 native MAC address to the data. Such data can include information regarding a CPE's 106 particular configuration including, inter alia, the specific services a CPE 106 is associated with, what a CPE 106 is authorized to tune to, etc. Alternatively, enrichment may take the form of pre-processing of data or converting it to a desired format or form. For instance, "fuzzy logic" variables (e.g., "high", "medium", "low") can be converted to a linear or other reference context (e.g., "10-7.5", "7.4-3.5", and "3.4-0", respectively), or vice-versa. As another example, search terms or primitives can be generated or converted from other data, so as to be more useful in a search engine. Myriad other types of "enrichment" will be recognized by those of ordinary skill given the present disclosure, the foregoing being merely illustrative of the broader principles.

The audience qualifiers and other data are then optionally anonymized at the anonymization portion 224c of the mediation entity 224. Data may be anonymized by inter alia, the use of a cryptographic hash. In one embodiment, the techniques for providing anonymity utilizing a cryptographic hash described in U.S. patent application Ser. No. 11/186,452 filed Jul. 20, 2005 and entitled "Method and Apparatus for Boundary-Based Network Operation", which is incorporated herein by reference in its entirety, may be utilized in conjunction with the present invention. As disclosed therein, the identity of a CPE is anonymized by using a cryptographic hash coupled with an optional "opaque" variable which carries information relating to the CPE of the hash with which it is associated. The hash and opaque variable frustrate de-encryption or reverse-engineering of the individual subscriber's identity or specific location. Alternative methods of providing anonymization may also be utilized consistent with the present invention.

As illustrated in FIG. 2, the anonymized data is then passed to at least one of a plurality of data warehouses 232, 236, 238. The data warehouses 232, 236, 238 are adapted to store data and retrieve stored data for requesting entities. The data warehouses 232, 236, 238 may, in one embodiment, be adapted to utilize one or more computer applications to perform Nielsen-like analysis, and report results to requesting entities (not shown). In another embodiment, the warehouses 232, 236, 238 are in communication with one or more raw storage entities (not shown). At the raw storage, raw records (i.e., unanalyzed data) are maintained for a pre-set period of time. In one example, the raw storage entities may be adapted to maintain raw records for 12 months in a "rolling" fashion, such that once data has aged 12 months it is dropped from the storage and newer data takes its place. Exemplary raw storage entities may comprise a hybrid of storage area network (SAN), virtual tape library (VTL) and offline tape storage, or RAID array; however, other configurations having alternate components may be used as well.

In another embodiment, each of the headend collection entities 222 may comprise an individual mini-warehouse (not shown) for storage or analysis of "local" audience research data; e.g., that pertinent to the subscriber base associated with that entity 222. According to this embodiment, after a certain period of time, at a particular time of the day, or upon warehouse 232, 236, 238 request, data in the mini-warehouse will be sent to one of the "global" warehouses 232, 236, 238, thus reducing traffic to and from the warehouse 232, 236, 238. The data warehouses 232, 236, 238 to which the anonymized data may be sent is in communication with an audience qualification subsystem 234.

The audience qualification subsystem 234 takes the entire population of STBs and applies audience qualifiers which describe arbitrary PIs, or in some cases PIs which are known to be important to a particular advertiser(s). A pool of actual viewers associated with the PI can then be determined and marketed to advertisers. The audience qualification subsystem 234 rather than utilizing real-time advertisement insertion, enables "mining" of the data warehouse to find appropriate audience qualifiers. In other words, the audience qualification subsystem 234 enables an operator to know that a particular PI (and the audience qualifiers that describe it) has a meaningful population among a group of CPE. This information may then be used to build an advertising campaign.

The data warehouses 232, 236, 238 may further be in communication with a status entity 222 adapted to utilize the anonymized data to extract information regarding the status of the secondary content (i.e., time of day, frequency, etc. with which an advertisement has been inserted into primary content) and a billing entity 240 adapted to generate a bill for the insertion of the advertisement based on the determined status, the bill then being delivered to an entity associated with the advertisements as will be discussed below.

In one embodiment, a profile is used to describe a portion of an audience which may be translated to a series of audience qualifiers (e.g., "young wealthy mothers"). Salespersons are able to sell advertisements against profiles, for example, the salesperson may assert to a Ford dealer that its new product targeted to young women may be directly advertised to 200,000 "young wealthy mothers" in Charlotte. The profiled translates to a specific set of audience qualifiers which are then used to identify placement opportunities.

Each CPE for which a particular placement opportunity is valid is then, in real-time, connected to the ADM 226. The ADM 226 uses information regarding what each CPE is tuned to in order to determine which CPE are viewing a channel when an insertion opportunity occurs on that channel. The ADM 226 may then "average" the audience qualifiers associated with each CPE (provided by the SIS 225) in order to determine a "best fit" profile from among all of the profiles. The list of AQs associated with the "best fit" profile are used in a query to the ADS to get an advertisement.

If a salesperson has sold more than one advertiser on the same profile, the advertisements may be weighted so as to correlate with the "best fit" profile. In one embodiment, when the ADS gets a request for an advertisement against the AQs associated with the profile, the ADS must decide from among all of the advertisers who purchased in the profile. In a further embodiment, each sale will have a "flight window" indicating the time it should be viewed, an "audience guarantee" indicating the number of viewers meeting the profile that will view the advertisement and/or a "potential for revenue".

These factors may be used in determining which advertiser will be apportioned the spot. One or more of these factors may be weighted as necessary to arrive a "best fit" solution.

Further, the data warehouses 232, 236, 238 may share anonymized or otherwise pre-processed version of the audience data, and/or the raw analyzed data itself, with other requesting entities (such as those entities which in the past have relied on Nielsen rating data). The aforementioned communication may be transport agnostic and may utilize for example web services, SOAP/XML/HTTP/TCPIP communications. The message format may be an XML structure.

The POIS, which is in communication with the ADM, may be utilized to identify placement opportunities. The POIS is an interface which, when implemented, provides the ability for describing a placement opportunity. Identifying or triggering a placement opportunity may be session setup based (i.e., based on user events), or may be signaled with OOB communication techniques such as SCTE 35, DVB-SAD, and/or DSM-CC. A signal may be used to mark a point in the stream (or in the user-initiated case, an event). The POIS supplies "policy" information surrounding what the opportunity looks like (30 seconds and 60 seconds) and, inter alia, ownership information. The ADM is then able to detect the events and apply the policy offered from the POIS, and obtain a decision from the ADS.

The order entry 242 and status module 244 provide a real-time ability to track effectiveness of a campaign. Tracking may include utilizing information regarding the anticipated audience (e.g., what a salesperson determined the audience to be). As the ADM 226 works with the SIS 225 to play the spots necessary to fill the order information is collected (via the mediation layer). Over a given period of time, a salesperson can examine the status of the campaign and determine how close the actual audience was to the anticipated audience. In other words, the status module 244 enables mining of the data warehouse to find audience qualifiers which are useful.

The audience qualification subsystem 234 is able to apply audience qualifiers across a population to generate arbitrary patterns of interest having a meaningful population and in which an advertiser may be interested.

Audience Qualifier Classification—

As discussed previously, one aspect of the present invention regards generation of a series of common characteristics among an audience, i.e., audience qualifiers, which are then classified for future use. Based at least in part on the audience qualifiers, individual ones of the plurality of secondary content stored at the secondary content store 228 may be selected to be transmitted to the audience as described in previously referenced U.S. patent application Ser. No. 12/503,710 entitled "METHODS AND APPARATUS FOR TARGETED SECONDARY CONTENT INSERTION".

Figure 3:
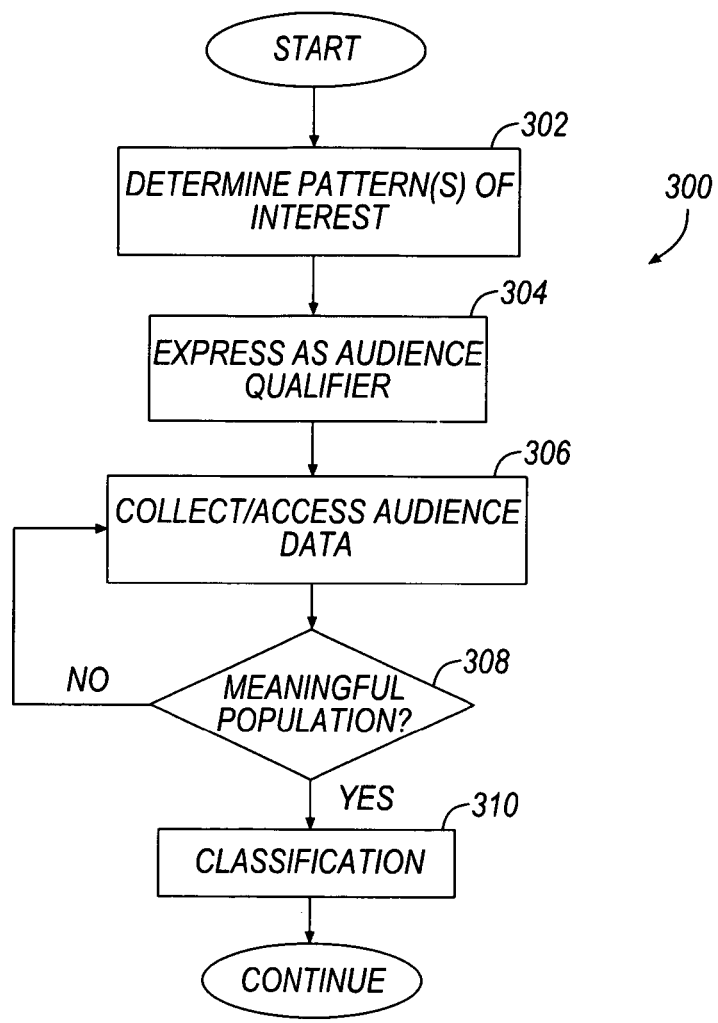
FIG. 3 is a flow diagram illustrating an exemplary method of generation and classification of audience qualifiers according to the invention.

In one embodiment, audience qualifiers are generated and classified according to the method 300 illustrated in FIG. 3. As illustrated, per step 302, one or more patterns of interest (PI) are first determined. The PI are audience characteristics which are chosen by an operator of the system as being useful or potentially useful in e.g., selecting subsequent content to provide to the CPE 106. For example, a particular retailer may be interested in the CPE 106 tuning to a particular program, selecting a particular VoD or PPV content element for delivery, or searching the Internet for particular content, thus this event may be considered a "pattern of interest". At step 304, the PIs are expressed as audience qualifiers. It is appreciated that the PI (and audience qualifiers) may be arbitrarily chosen, or chosen based on predetermined factors or features. The PI and audience qualifiers are Boolean expressions for characterizing data.

Next, at step 306, data is collected regarding an audience. In one variant, the data may be collected by a headend collector 222 from each of a plurality of CPE 106 in communication therewith. The data collected may comprise for example a size of an audience of a particular program. The data may further comprise information regarding tuning events at individual CPE 106. For example, the headend collector 222 may collect information indicative that a particular CPE 106 tuned to a program on Channel X from 8:52 pm-9:03 pm, or ordered on-demand or PPV content, etc. The data may further comprise manipulation or trick mode usage events; e.g., that the user fast-forwarded, rewound, paused, etc. the program over a given interval. For instance, LSCP (lightweight stream control protocol) or other commands sent to the headend by a particular MAC address may be recorded. Still further, data may be collected regarding the capabilities of each of the CPE 106, such as, e.g., whether the CPE 106 have DVR capabilities, whether the CPE 106 is capable of retrieving data via internet protocol (IP), etc.

Data may also be obtained passively regarding the audience at a given time. For instance, one embodiment of the method 300 of FIG. 3 determined which CPE 106 are currently active on the network (such as via a "heartbeat" indication from hardware or software on the CPE, tuning activity every so often, etc.), and via the device MAC address or hashed variable, which particular subscriber account is associated with that CPE. Stored data (such as user demographic/psychographic data obtained at time of sign-up, or gleaned from subscriber behavior over time) can then be accessed and utilized as a basis of qualification. For example, a given subscriber with a CPE having a certain MAC address may have indicated in their subscriber profile that they are age 40, make $100,000 per year, live in zip code 92127, have a family of four, enjoy golf, etc. This stored data can be accessed and analyzed in light of many other CPE active on the network at that same point to identify commonalities or patterns.

Figure 2B:
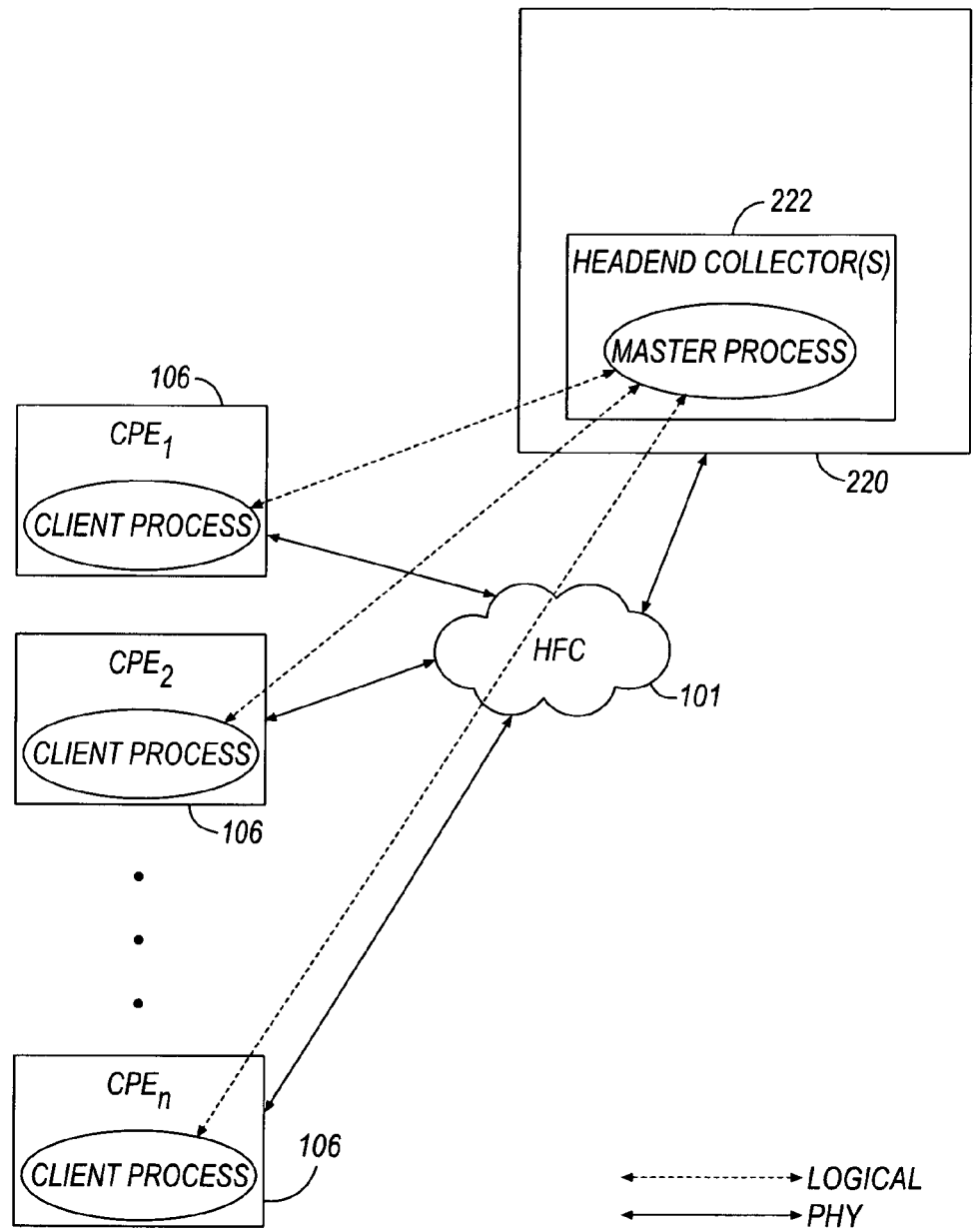
FIG. 2b is a block diagram illustrating one exemplary client/master software architecture according to the invention.

Alternatively, in another variant, a software process resident on each CPE (or selected subsets thereof) can monitor and collect data such as that described above, and package it for transmission to a headend process (e.g., software application running on a headend server or other apparatus). For instance, a distributed application (DA) having client and server portions may be used (see, e.g., FIG. 2b), wherein the client portion collects and assembles required data, and transmits the data in a file or other data structure periodically, or when requested by the server portion.

At step 308, it is determined whether the pattern of interest (and associated audience qualifier) have a "meaningful population" In other words it is determined whether the number of CPE meeting the criteria of the PI (and/or audience qualifier) satisfies a predetermined threshold. In one embodiment, a population is deemed meaningful if a predetermined number or percentage of CPE 106 share the characteristic. Accordingly, at step 308, an entity (such as the enrichment portion 224b of the mediation entity 224) may compare the number of CPE 106 reporting the characteristic. By way of example, suppose an operator determines that tuning to a particular program at a particular time (or within a time range) is to be a pattern of interest. Then, as data is collected regarding CPE 106 which have tuned (or are likely to tune) to the particular program (at step 306), a running total of the number of CPE 106 tuning thereto is maintained. When the number or percentage of CPE 106 tuning to the program exceeds the predetermined threshold, there is a meaningful population within the given definition. Up until the threshold is met, data continues to be collected. In other words the method repeats at step 306; if a population is not large enough to meet the threshold, data collection will continue until enough CPE 106 share the pattern of interest to continue the method 300.

It will be recognized that the analysis of step 308 may be based on historical data (e.g., stored in the database referenced above), that obtained in real-time or contemporaneous with the analysis, or both. For example, one embodiment of the invention uses entirely past or historical data, and determines which of the data to access and use for the population analysis based on which CPE are currently active on the network (e.g., CPE with MAC address "X" has in the past frequently exhibited the pattern of interest, and that CPE is currently active). Alternatively, contemporaneous or real-time data can be added or used solely, such as where a given CPE has just requested a tune to frequency/modulation mode/program number "Y" (corresponding to a given program channel for example), and that tune request is a pattern of interest.

In one embodiment, after a predetermined amount of time has elapsed or data has been collected, the operator may be notified that the pattern of interest is not shared by a sufficient number of CPE 106. In response the operator may either adjust the threshold number/percentage of CPE 106 required to become an meaningful population and/or, may begin again at step 302 and select a different pattern of interest. Moreover, the method of FIG. 3 can be run on different patterns of interest in parallel; e.g., by one or more threads or processes running within the analytical software.

Once a population is determined, at step 310, the population is classified. In one embodiment, the population is classified according to psychographic variables, demographic makeup, behavioral variables, and/or other characteristics such as Claritas PRIZM code, or other market segmenting service code, etc. Exemplary psychographic variables may include, inter alia, preferred genres and actors, interests and hobbies, preferences, as well as other attributes relating to personality, values, attitudes, or lifestyles. Demographic information regards for example race, age, citizenship, income, disabilities, mobility (e.g., length of commute, number of vehicles, etc.), education level, home ownership, employment status, use of services (e.g., wireless or cellular, satellite versus cable, VoIP, etc.), and geographic location.

Behavioral variables regard the type, rate or loyalty with which a person does something (e.g., always/sometimes/never watches a particular program, etc.). For instance, one behavioral classification may relate to consistency; i.e., irrespective of what action is being considered, a given subscriber is extremely consistent (e.g., consistently watches same programs at the same times every week, etc.), which can then be sub-classified if desired (e.g., always watches American Idol at the same time each week). Hence, an advertisement for a program entitled "The Making of American Idol—Behind the Scenes" may have significant penetration with an audience qualified and classified as "consistent" and sub-classified as "consistently watches American Idol".

Yet other variables and types of variables may be used in the classification process of FIG. 3 as well. For instance, predictive or statistical variables (e.g., the probability that someone will take a certain action at present or sometime in the future, and when) may be used. The classified population may then be utilized as will be discussed herein below.

Campaign Management—

In one embodiment, the order entity 244 is adapted to run at least one computer application for campaign management thereon, although it will be appreciated that the application may comprise multiple components or processes which are either co-located or distributed across two or more entities within the system of FIG. 2a. The campaign management entity (CME) enables an operator associated with MSO to control one or more aspects of secondary content selection and insertion, therefore enabling an operator to ensure that the goals of the secondary content providers (e.g., advertisers) are accomplished. The campaign management application further allows the MSO to create and maintain billing schema for the various secondary content providers. The CME may further be adapted to manage conflicts, and optimize business value or other business-related parameters such as profit and/or revenue.

The campaign management application may be further configured to provide a user interface which enables the operator associated with the MSO to perform the campaign management functions described herein, whether in whole or part, as well as make adjustments to settings, or simply monitor activity.

Figure 4:
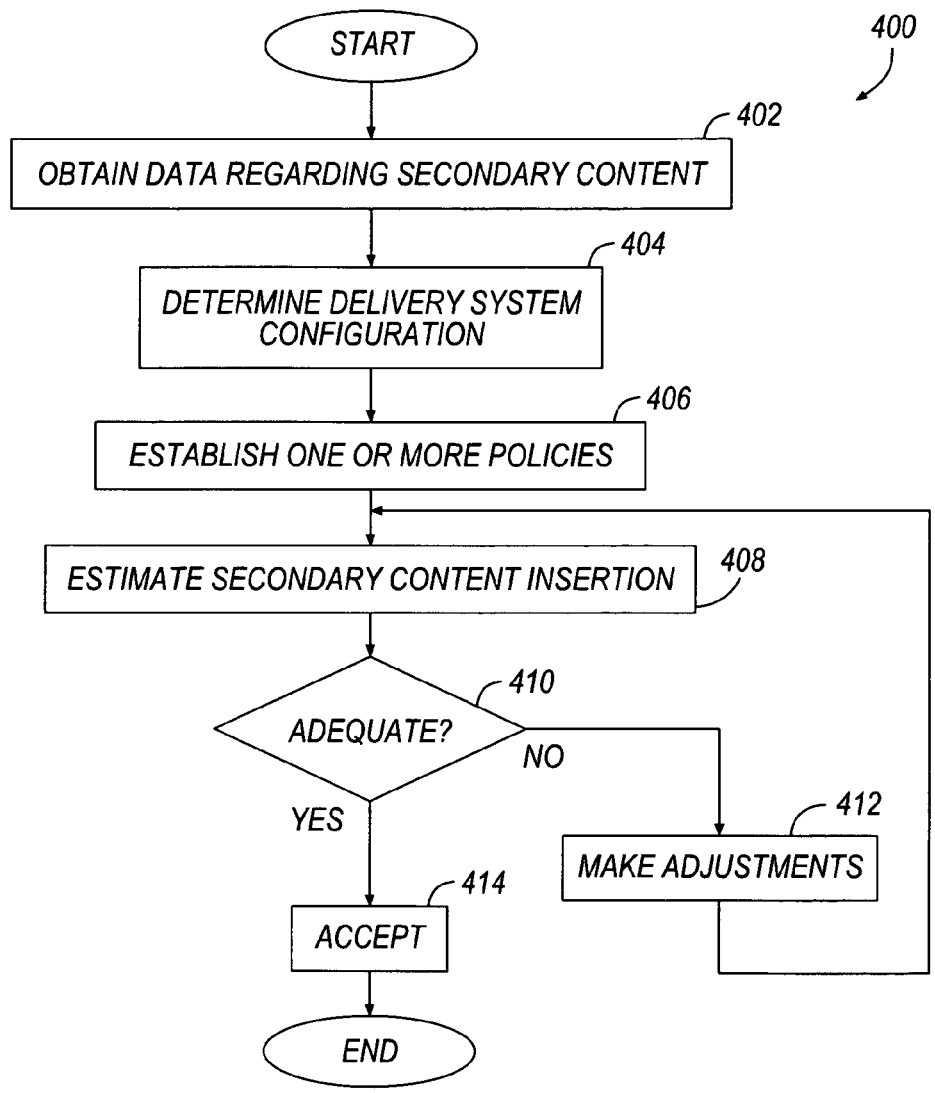
FIG. 4 is a functional block diagram illustrating an exemplary method for managing a secondary content provider's campaign.

FIG. 4 illustrates an exemplary method 400 for managing a secondary content provider's campaign. As illustrated, per step 402, information regarding one or more qualities of a target audience for the secondary content associated with the provider is obtained. Data regarding a target audience may be provided from a source associated with the secondary content, or alternatively may be developed by the MSO utilizing information supplied by the source associated with the secondary content. In one embodiment, the data comprises descriptive data files as discussed below.

Next, per step 404, the campaign management entity may further determine the system configuration necessary for the presentation of the advertisements of the campaign based on the delivery platform. For example, campaign management system will automatically determine which ADM/ADS systems, Application Servers 104, VOD server 105, etc. to use based on a geographic location (e.g. Atlanta, Charlotte, etc.) and desired delivery paradigm.

It is appreciated that a determination of the type of secondary content to be presented can also be made by the campaign management system at this step (step 404). For example, an MPEG stream (including advertisement replacement, advertisement insertion, and region replacement) may be selected for e.g., linear broadcast, VOD, VODx, DVR, and scaled video (as disclosed above) delivery platforms. Still image content may be selected for, e.g., broadcast overlay, insertion into a programming guide, and telephone user interface content insertion. Text content may be selected for delivery to e.g., a CPE (such as a set-top box), an email account, a cellular or mobile phone, or to a personal or other computer (such as via instant message or SMS such as "Twitter").

For advertisements destined for insertion into an MPEG stream, information may also be provided regarding: networks on which the advertisement should run, genre of the primary content into which the advertisement will be inserted, and/or ratings of the primary content into which the advertisement will be inserted. For advertisements destined for still image or graphic insertion, information may also be provided regarding whether a request for information (RFD) is required in the electronic program guide (EPG) or cell phone user interface when playing back the advertisement. In one embodiment, a graphic is displayed to a user via the EPG and directs the customer to push a button, etc., specific information (based on the message on the graphic) is then be collected and sent to a fulfillment house.

Next, per step 406, one or more policies or rules for the secondary content associated with a provider may be established. For example, the campaign management entity (CME) may establish the particular primary content (and location or placement therein), physical channel, geographic location, etc. where an advertisement(s) may be inserted, the length of time a particular advertisement(s) may be aired, and/or the number of individual insertion instances of the advertisement(s). These policies or rules can be thought of in one embodiment as a set or restrictions or limitations on placement, so as to avoid operational or other issues. For instance, one rule might comprise that a certain advertiser's advertisements (or a subset thereof, such as those associated with one particular campaign of that advertiser relating to a National Football League team associated with a certain city) can only be inserted into linear or non-linear content that is delivered to a prescribed set of zip codes that relate to the aforementioned city. This avoids advertisements for games, paraphernalia, etc. associated with that team being played in another city which may have an NFL team which is a rival to the first team.

The campaign manager may further establish rules relating to, inter alia, a determination of the channels, programs, delivery platforms, etc. on which the campaign may be run, the length of the campaign, the number of advertising spots (e.g., different variants or versions of a given advertisement or ensemble of advertisements) associated with the campaign. Further, for each advertisement spot, the campaign manager may determine where the spot may play (e.g. which delivery platforms, channels, etc.). As noted above, this determination may be based at least in part on system configuration and/or on the type of content the advertisement comprises. For example, if the spot is an MPEG stream (including advertisement replacement, advertisement insertion, and/or region replacement), it may be delivered in linear broadcast (e.g., BSA), VOD, VODx, DVR and scaled video platforms. If the content is a still image it may be presented on a web page, and so forth.

In yet another embodiment, the campaign manager may utilize information regarding inter alia, start and stop date for an advertisement(s), characteristics of a target audience for an advertisement(s), times of the day/week to run an advertisement(s), a number of times an advertisement(s) should be inserted (e.g., minimum and maximum values), and the types of CPE (or even particular CPE or groups thereof) to which an advertisement(s) may be delivered. Information regarding a minimum and/or maximum number of times a particular advertisement may be inserted into primary content on each of the different CPE or CPE types may also be utilized.

Hence, the aforementioned policies or rules may vary in degree of "granularity", and in fact a plurality of different rules of different level or granularity may be used together.

Figure 4A:
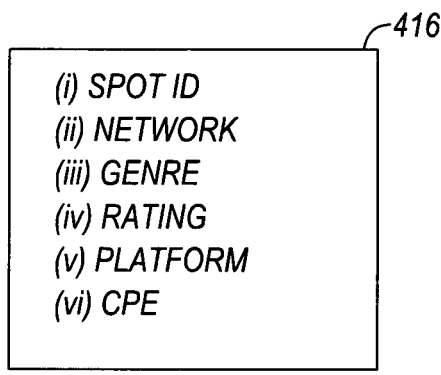
FIG. 4a is a graphical illustration of an exemplary spot record.

Additionally, in order to make the determinations about whether certain restrictions must be taken into account or implemented, the management entity records certain information about spots that are played. In one embodiment, information is stored in a data record as illustrated in FIG. 4*a*. As shown, each instance when a particular secondary content (spot) is presented to an audience a spot record 416 is created. In one embodiment the record 416 comprises at least the (i) the Spot ID (SID), (ii) the network on which the spot played, (iii) the genre, (iv) the rating of the secondary content (if such rating exists), (v) the type of display platform to which the spot played, and (vi) the CPE on which the spot played. It is appreciated that this CPE information may be anonymized using e.g., the cryptographic hashing approach discussed previously.

Per step 408, the campaign manager uses the aforementioned information regarding the secondary content (data records of FIG. 4*a*) as well as the policies/rules (step 406) and configuration information (step 404) to estimate a frequency at which secondary content from the campaign may be selected, which can be interpreted as an indicator of the "viability" of the campaign. In one embodiment, the frequency an advertisement is selected is based on the closeness of the advertisement to the audience. According to this embodiment, the viability demonstrates a general impression of the capability of the advertisement to reach its intended audience.

The viability may be given as a function of a single delivery platform, or may take into account insertion opportunities in several platforms. The campaign manager may further examine placement opportunities within scaled video programs, allowing for inter alia "side bar" placements for matches to an advertiser's campaign. It is further appreciated that the campaign manager may project the number and dimensions within each program for region replacement. For example, in the online space a special placement opportunity may be defined such as, e.g., "towers" and "banners". If placements are made into the program (or not), the campaign management entity may be able to project the frequency the banner opportunity (or placement if one is already there) will be available (e.g., twice an hour) and the size, shape etc. the ad will be confined to (e.g., top 30% with dimensions not to exceed 50×100 pixels, etc.).

It will also be appreciated that the foregoing estimation may be multidimensional in nature. For instance, the frequency of selection estimated based on a first set of data (e.g., relating to a particular attribute, audience demographic, feature of an advertisement, etc.) may be different than that for a second set of data relating to the same audience and/or same advertisement. Hence, in one embodiment of the invention, a plurality of estimations are made for the same secondary content element and/or audience, and considered as a whole (such as via mathematical simple or weighted averaging, statistical analysis, etc.).

The campaign manager may also use linear regression of historical VOD or VODx data (or other statistical or extrapolation techniques) to determine expected VOD orders or usage over the life of an advertisement, and then combine that information with audience characteristic information to match the VOD and VODx placement opportunities with an advertiser's campaign. In one embodiment, the campaign manager may provide the ability for a sales representative to "research" in order to determine based on the advertisement and platform how many households the advertisement will "hit". Similarly, linear regression of historical DVR usage may also be utilized by the campaign manager to determine expected DVR usage over the life of an advertisement, which is combined with audience information to find potential matches for an advertiser's campaign.

Late binding overlays are graphical overlays carried on the actual program stream but added to the program stream in the MSO system instead of when the content is encoded. The number of late binding overlays scheduled for insertion in linear broadcasts may also be utilized for prediction of placement opportunities which may match an advertiser's advertising or campaign goals. Expected Interactive Program Guide? (IPG) launches over the life of an advertisement may also be predicted using linear regression of historical IPG launch/page change information, and used by the campaign manager to facilitate an advertiser's goals. Further, the number of web pages on which insertions can be made, and the number of locations on each of those pages, may be predicted and utilized as above.

Similarly, prediction techniques such as determining a linear regression of historical cell phone user interface access usage may be used to predict expected user interface accesses over the life of an advertisement which matches an audience thereof.

In yet another embodiment, administratively configurable rules may be implemented with respect to the number and/or type of advertisements. For example, the sales representative may be limited to a certain number of advertisements per CPE, a maximum number of text messages, etc. An administrator may configure the advertising system to implement the aforementioned rules.

In one embodiment, the campaign manager may utilize the methods disclosed in previously incorporated, co-owned U.S. patent application Ser. No. 12/503,710 entitled "METHODS AND APPARATUS FOR TARGETED SECONDARY CONTENT INSERTION" filed on Jul. 15, 2009 and now patented as U.S. Pat. No. 8,813,124, in order to find advertisements which are related or targeted to the audience.

Figure 4B:
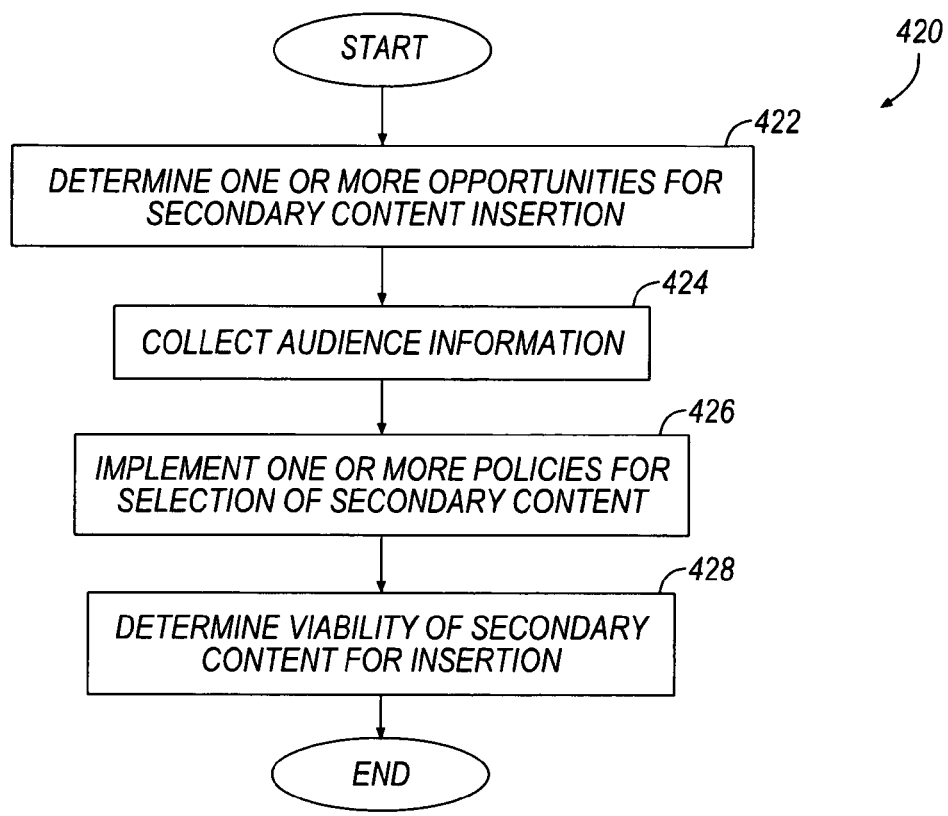
FIG. 4b is a functional block diagram illustrating an exemplary method for estimating the vitality of a secondary content provider's campaign.

In another embodiment, an estimate of the viability of a secondary content provider's campaign is generated via, in one embodiment, the method 420 shown in FIG. 4b. As illustrated, per step 422 of the method 420, one or more opportunities for insertion of secondary content are determined. In one embodiment, the opportunities may be determined well in advance of the scheduled broadcast presentation of the primary content. In another embodiment, the MSO itself may place secondary content insertion opportunities at locations it has determined within the primary content stream (such as via e.g., digital program insertion cues such as those disclosed in Society of Cable Telecommunications Engineers standard for Digital Program Insertion Cueing Message for Cable, ANSI/SCTE 35 2004, incorporated herein by reference in its entirety).

Next, per step 424, information regarding the audience at one or more placement opportunities is collected and analyzed to generate audience qualifiers. This information may be collected at some time in advance of the audience actually viewing the stream or, alternatively, may be collected just prior to the insertion opportunity. The information may be collected by the MSO (e.g., via the infrastructure of FIGS. 2-2a as previously described), or even by a third party having knowledge and access to the audience at that opportunity (such as via the Internet or cellular/wireless network).

In one embodiment, user privacy is maintained by implementing a one-way hash and/or by utilization of an "opt-in" system (wherein the users affirmatively agree to have data collected and transmitted as described herein). The exemplary system would further use the same one way hash on anonymized data stores from disparate systems (e.g. billing, etc.), thus allowing correlation and enrichment of tuning records while maintaining user privacy. In one embodiment the SIS 205, when obtaining characteristics of the CPE 106, utilizes this same hashing algorithm. Thus, when an ADM 206 sends a request for information on a particular CPE 106, the SIS 205 is advantageously able to use the common one-way hash to evaluate a hash value against database of anonymized CPE 106 and their respective characteristics, and to retrieve the characteristics for the particular CPE 106. In one embodiment, the techniques for providing anonymity utilizing a cryptographic hash described in U.S. patent application Ser. No. 11/186,452 previously incorporated herein may be used to protect the user's privacy in the above described information collection and transmission, although it will be recognized that other approaches may be used as well.

Per step 426 of the method 420, one or more of the rules or policies discussed above are implemented with respect to the placement opportunities. For example, if the placement opportunity comprises a linear broadcast insertion opportunity, still image secondary content may be disqualified from selection.

In another example, the campaign manager may establish that for certain times during the day or during certain programs, certain advertisers should be favored, and thus selected even above other advertisers having closer psychographic or demographic proximity to the target audience. For example, suppose that the automobile manufacturer Ford is a sponsor of a weekly television show; suppose further that the target audience for an advertisement within a campaign for an upcoming concert is more closely aligned with the viewership of the television show. Even though the concert promotion is more targeted to the audience, in this embodiment the Ford commercial may be placed first in a series of commercials (or at another advantageous location) relative the concert promotion, thus reducing the number of insertion opportunities available to the advertisements in the campaign.

In another example, the campaign manager may be adapted to institute one or more rules which are configured to cause secondary content from the campaign to be denied insertion opportunities based on the day of the week, particular physical channel, etc. of the insertion opportunity. The campaign management entity (CME) may utilize the aforementioned rules and policies to ensure each advertiser's advertisement goals are met (or at least optimized to the maximum degree).

Per step 428, the ADS 210 utilizes one or more algorithms to determine the number of instances secondary content from the advertiser's campaign will be selected for insertion given the current descriptive data regarding the secondary content and the audience for upcoming insertion opportunities. In other words, the campaign manager manages information regarding the target audience for advertisements. The campaign manager also is adapted to predict insertion opportunities (using linear regression or other methods) and determine, based on previously obtained information, the characteristics of a predicted audience at the predicted insertion opportunities. The campaign manager then uses the above data to estimate the viability of an advertisement campaign.

Referring back again to FIG. 4, once the frequency of insertion of secondary content insertion has been estimated (step 408), the estimate is evaluated at step 410 to determine whether the estimated number of insertion opportunities for the secondary content in the campaign is adequate. If so, the secondary content is accepted and stored for future use in secondary content insertion (step 414). In other words, if it is estimated that the secondary content will match upcoming insertion opportunities to an adequate level, no changes need be made to e.g., the rules and/or the descriptive data associated with the secondary content of the campaign. The adequacy of the number of insertion opportunities may be based on e.g., historical campaigns, a predetermined level, etc. In one embodiment, each advertisement within a campaign may be promised or contracted a specific number of audience "hits" (e.g., actual viewing instances), accordingly, the adequacy of the number of insertion opportunities must be based on the promised number.

However, if at step 410 it is determined that the secondary content of the campaign is not estimated to provide an adequate number of "hits", one or more adjustments to the secondary content and/or the campaign are made per step 412. In one embodiment, adjustments may be made to the one or more rules or policies established above, whether by a substantially automated process, by human review an intervention (e.g., via a GUI or other user interface by which a human can review the data and make adjustments), or combinations of the foregoing as described in greater detail below. For instance, in one variant, rules or policies can be varied in an incremental fashion, and the campaign re-evaluated, much along the lines of a sensitivity analysis. When an optimal level is reached, the campaign is employed, and that information, can be saved for future use.

In another embodiment, values of the weight and/or variance (as given in the descriptive data relating to one or more given advertisements) for individual ones of the secondary content of the campaign may be adjusted, such as via the aforementioned automated and/or manual means. According to this embodiment, each secondary content element is associated with a descriptive data file which indicates the relative "weight" and "variance" assigned to each of a plurality of characteristics that relate to the audience qualifiers discussed above. The weight is a measure of the relative importance of one qualifier over another when matching an audience to the content. Variance, in one embodiment, is expressed as a percentage, and provides a value for an allowance to the audience attribute. In one embodiment, the descriptive data files are of the type disclosed in previously incorporated co-owned, co-pending U.S. patent application Ser. No. 12/503,710 entitled "METHODS AND APPARATUS FOR TARGETED SECONDARY CONTENT INSERTION" filed on Jul. 15, 2009 and now patented as U.S. Pat. No. 8,813,124. As discussed therein, the weight and variance give a hard and soft range for individual attributes of a target audience for each secondary content.

Adjustments may be necessary, for example, if it is determined that a current weight and/or variance combination generates too many or too few "hits" on advertisement opportunities as compared to an established set point or predetermined threshold. In other words, the weight and/or variance may make the particular content directed too closely to a particular target audience which does not often appear in the available placement opportunities. Alternatively, the weight and/or variance may define the secondary content target audience too broadly, thus making it seem as if nearly all target audiences match the content. In either instance, the necessary adjustments are made to the weight and/or variance to correct any such problems.

In one embodiment, the aforementioned methods are performed with respect to a single aspect of one or more of the secondary content elements of the campaign. Alternatively, the weight and/or variance of a plurality of aspects may be adjusted for one or more of the secondary content elements of the campaign, whether individually (sequentially) or in parallel.

As noted above, the adjustments to one or more aspects of the secondary content data files are made in one embodiment automatically by the campaign manager entity (CME) or other entity running a computer program thereon, via an operator associated with the MSO or advertiser empowered to make adjustments (via a user interface to the CME or other program), or both. These adjustments can also be made in a cooperative fashion (e.g., upon coordination or collaboration of the MSO and the advertiser), or in a hierarchical manner (e.g., where the MSO or advertiser recommends changes, and the other reviews and accepts or denies the changes). Similarly, the CME or other computer process can be configured to be fully automated in nature.

Once adjustments have been made, the method repeats at step 408 to ensure that the secondary content now meets one or more predetermined "hit" requirements. If too many or too few "hits" are still estimated for the one or more aspects of interest (or an aggregated criterion, such as previously described herein), adjustments will continue to be made per step 414. Alternatively, if the secondary content descriptive data files comprise attributes with weight and/or variance which produce an adequate number of suitable advertisement insertion opportunities, the descriptive data files are accepted (per step 414) and may be utilized, for example, in the secondary content selection as discussed above.

As campaigns are built, available inventory may be reserved by MSOs or advertisers (depending for example on the structure of the MSO program and allowed interfaces provided to their advertisers), so as to preclude others from using it. This may take the form of an outright purchase of the inventory, an option or right of first refusal for a specified period of time, or other structure. It is appreciated however, that a reservation of or option on inventory may be canceled as needed based on audience changes, delivery platform restrictions, changes of the advertiser (e.g., new product launch or cancellation of a product or service, etc.).

Moreover, in that inventory is a valuable and largely transferrable commodity, a "secondary market" of sorts may be created by the MSO and/or advertisers for reserved inventory. For instance, in one variant, advertisers who have reserved or possess options on inventory can put them up for bid by other advertisers or potential users, such as via a centralized exchange or venue (e.g., website akin to the well known "eBay" service). In this fashion, an advertiser can release or assign their reservation or option to another party desirous of obtaining it, under a "highest bidder", "first come first served", or other paradigm. This can be used to advantageously alleviate the MSO of having to try to sell the inventory. Moreover, the MSO can impose rules on parties eligible to participate in the secondary exchange; e.g., only pre-approved MSO advertisers or clients who have placed a security deposit, have had their secondary content pre-approved, etc.

Overbooking—

In another embodiment of the invention, the advertising or promotional campaigns is of multiple advertisers are established by determining a location for insertion of at least one advertisement associated with each advertiser at a given placement opportunity. This purposeful "overbooking" (i.e., so that the number of available advertisements exceeds the need at a particular insertion opportunity) may be performed to, inter alia, ensure that an MSO has sufficient bookings to fill 100% of its placement opportunities, somewhat akin to airline seat reservations. For example, if only two advertisements are required, the CME or advertisement decision server 210 (or other similar entity) may select six advertisements for insertion therein, based on the target audience as defined by the descriptive data files of each, and what is known about the audience at the insertion opportunity (audience qualifiers). The advertisers associated with the six selected advertisements may, in one embodiment, be billed for the possibility that their advertisement may ultimately be selected as one of the two which are actually required. Specifically, a tiered or option structure might be used, such as where an advertiser is billed a first amount for the possibility of being considered for a given inventory item or opportunity, and a second amount if actually selected for one of the two aforementioned slots.

Alternatively, only the advertisers associated with the advertisements ultimately selected for insertion may be billed. As yet another option, all "candidate" advertisers could be billed the same amount or on the same structure up front, and then refunded or compensated if their advertisement is not played or selected for insertion. Moreover, advertisers which are part of the candidate pool (i.e., six in the foregoing example) might be given an opportunity to "sacrifice their seat" as it were as the time of insertion approaches, at no cost or in trade for a later inventory item. Many other types of business models used in pricing and/or billing as part of an "overbooking" scenario will be recognized by those of ordinary skill given the present disclosure.

When the placement opportunity nears, in one embodiment, the audience of that opportunity may be classified once again, and selection from among the six advertisements may be based on the re-classified audience. As noted previously, re-classification enables the system to utilize data regarding the actual viewers present at the opportunity, and therefore provides a truer reflection of the audience than classification performed further in advance of the opportunity.

Selection from among the aforementioned six "candidates" may utilize the aforementioned policies and rules referenced above. Alternatively, selection may simply be made of the two advertisements having the highest level of similarity to the audience at the placement opportunity (as determined closer in time to the opportunity). Yet other factors may be used in place of or in conjunction with the foregoing, such as e.g., which advertisement will yield the highest revenue or profit (see discussion of "business rules engine" below).

Reporting Functions of the Campaign Manager—

As discussed previously, one or more spot records 416 may be created to reflect instances of secondary content playback. As indicated, the records 416 may comprise information including (i) the spot ID, (ii) the network on which the spot played, (iii) the genre, (iv) the rating of the secondary content (if such rating exists), (v) the type of display platform to which the spot played, and (vi) the CPE on which the spot played. Additionally, usage information may be collected for many different aspects of display platform access for ordinary least-squares linear regression. In other words, usage information may be subjected to statistical analysis for audience refinement, etc. The usage information and spot records 416 are then used to provide the MSO (e.g., a sales or advertising person, or even a computerized process) and, potentially the secondary content provider of the spot (e.g., customer/advertiser), with a view or analysis of campaign fulfillment as the spots of the campaign play. For instance, in one variant, campaign fulfillment can be monitored by a customer/advertiser via a website interface provided by the MSO, wherein the customer/advertiser can see the usage data and other related analyses or statistics.

The aforementioned reporting mechanisms enable the operator and/or customer to determine if certain campaigns are not meeting their predetermined advertising goals (i.e., the secondary content associated with the campaign are not being played, and/or are not reaching the target audience as can be evidenced by secondary or empirical data such as results of telephone surveys, user interactions or "click-throughs", related product or service sales data, subscriber feedback via online or interactive media, etc.). In order to help the operator understand why the campaign has not met its goals, it is sometimes important to store data relating to the decision making process as outlined above. Thus, for each placement opportunity, information regarding each secondary content element which was originally rejected is in one embodiment stored at the MSO data storage facility (e.g., within a data store of the system 220 of FIG. 2a), and optionally sent to the customer advertiser if desired. Further, the relative weighting for each secondary content element against the audience qualifiers received in the placement request is also stored. Finally, information regarding how each of the one or more restrictions or rules played into the final determination of which secondary content to use is also reported.

With this information, the operator can understand the selection/non-selection logic that was employed by the MSO with respect to that advertiser's advertisements (and optionally across the broader market of all of the MSO advertisers, such as via anonymization of data), and also how to "tweak"

the weighting and/or variance (and/or policies) to allow the secondary content to get more "hits" as discussed above.

Additionally, the campaign manager may allow the operator to define a "range" in which it could automatically adjust the weight and variance to increase the relative likelihood of the campaign "hitting" as placement opportunities arise. This process could be largely automated as well, according to a "trial and error", "random walk", linear regression, statistical, or other model. For example, in one embodiment of the invention, the aforementioned CME process is configured to periodically vary one or more parameters (e.g., weight and variance) within their prescribed range so as to, inter cilia, minimize chances that the campaign will totally miss one or more campaign goals (such as by being invariantly too narrow in one regard), and/or optimize performance or penetration/impressions. This process can be based on secondary data or feedback of the type previously described ("closed loop" system) such as e.g. results of subscriber surveys, click-throughs, review of campaign advertisement selections to date, etc., or alternatively without any feedback ("open loop", such as that based on a randomized or statistical variation model).

CPE—

Figure 5:
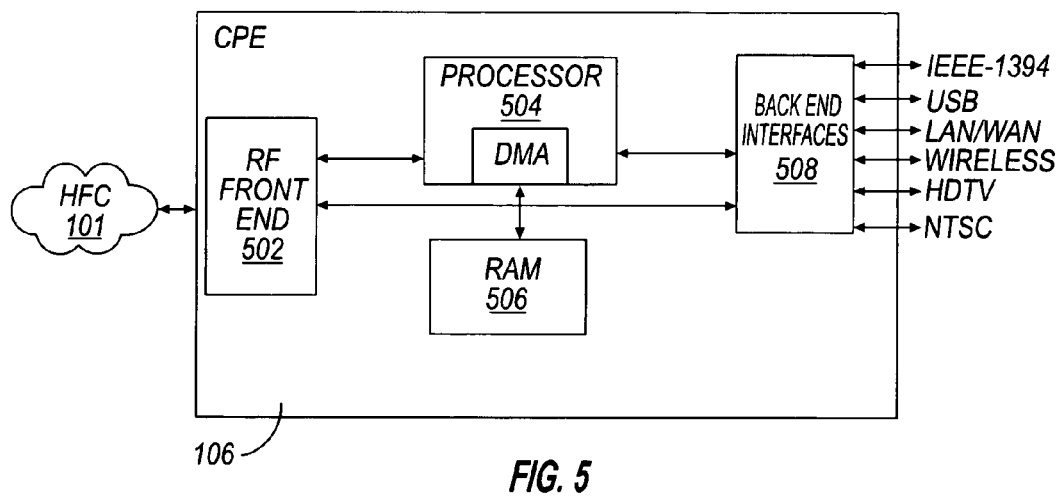
FIG. 5 is a functional block diagram illustrating an exemplary embodiment of CPE adapted to support data collection and transmission functionality.

FIG. 5 illustrates an exemplary embodiment of the improved CPE 106 according to one embodiment of the present invention. It will be appreciated that in MSO implementations where no CPE or client portion of the data collection software process is used, literally any type of CPE 106 that is compatible with the bearer network may be used. However, in cases where a client portion is desired (e.g., to obtain subscriber/use/CPE profile or operational data and send it back upstream to the network portion residing on e.g., the mediator, ADM or ADS of FIG. 2*a*), the following exemplary configuration may be used.

As shown in the simplified diagram of FIG. 5, the exemplary device 106 generally comprises and OpenCable (OCAP)-compliant embedded system having an RF front end 502 (including tuner and demodulator/decryptors) for interface with the HFC network 101 of FIGS. 1-1*c*, digital processor(s) 504, storage device 506, and a plurality of interfaces 508 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 5 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 5 is also provided with an OCAP 1.0-compliant application and Java-based middleware which, inter alia, manages the operation of the device and applications running thereon (including the aforementioned client software process where used). It will be recognized by those of ordinary skill that myriad different device and software architectures may be used consistent with the tuning functions of the present invention, the device of FIG. 5 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality need to support the data collection client process.

In another embodiment, the CPE 106 comprises a converged premises device, such as for example that described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety.

As previously noted, the CPE 106 of FIG. 5 further comprises a client portion of a distributed application (see FIG. 2*b*) configured to collect and/or transmit data, in the form of e.g., a software application running on the CPE. This software application may be configured to perform any number of functions relating to targeted advertising or promotion delivery, including without limitation: (i) forming a cryptographic hash of one or more CPE-specific variables in order to maintain the anonymity of the CPE/subscriber with respect to historical or profile data, as previously described; (ii) generating "telescoping" advertisement interfaces or other user interfaces that allow the subscriber to interact with the CPE; (iii) collecting data on user-specific activities such as tuning or activity logs, power on/off times/duration, PPV/VoD requests, frequency of use of other ancillary functions associated with the CPE, DVR or monitor operation and use (such as via communications from a connected DVR or monitor device), etc.; (iv) identifying and communicating CPE hardware or software errors logged by the middleware; (v) identifying and communicating new hardware or software components logged with the middleware registry, (vi) maintaining an advertisement "list" such as that described previously herein; (vii) causing or performing insertion of advertising content into recorded or received content; and so forth.

As previously noted, any data of interest may be directly transmitted to the upstream software portion (e.g., via an OOB message or other communication), or stored or logged in a file and sent when requested by the system 200 (or according to other models, such as being sent periodically, on CPE startup, etc.). Moreover, the network system 200 can also receive and log events during the normal course of operations (in conjunction with any data obtained and forwarded by the CPE software client or other processes running thereon), such as e.g., upstream OD content requests, PPV requests, LSCP "trick mode" commands, EPG update requests, etc.

Business Methods and Considerations—

Various exemplary business-related aspects of present invention are now described in detail.

In one embodiment, access to the various aspects of the audience classification system and to the various functions of the campaign management entity (CME) is provided for consideration or as an incentive to certain advertisers (e.g., those willing to pay higher premiums for access thereto). For example, access to the reporting functions, and/or the ability of the weights and/or variance to be adjusted depending on the number of "hits", could be used as a basis for charging additional consideration or as an incentive). In another embodiment, selection of an advertisement from among a plurality of available advertisements (e.g., in an overbooking situation) may be based on a subscription level of the advertisers.

It is also noted that an MSO may utilize the ability of the present invention to insert secondary content (including targeted secondary content) into the primary content as a business model with respect to advertisers. In other words, certain advertisers may pay a higher premium to have their advertising content associated with a particular subset of viewers, or where the MSO can "guarantee" a high ratio or number of impressions by a target audience or demographic. The MSO can, using the campaign manager described herein, ostensibly provide such a guarantee, since they are able to pointedly monitor which of the MSO's subscribers are watching a given insertion opportunity, and what their characteristics are.

Additionally, the MSO can "package" the data (e.g., the anonymized data for privacy concerns) relating to subscriber use activities and patterns, for sale or distribution to other entities such as advertisers, networks, etc. Knowledge of the viewing or other behaviors of particular demographics is a valuable commodity which can advantageously be leveraged using the present invention.

It will also be recognized that pricing of inventory or placement opportunities can be dynamically set based on other considerations, such as for example based on proximity in time to the actual opportunity. For instance, pricing may change (increase) as the placement opportunity approaches, akin to airline ticket pricing. As another alternative, pricing may be a function of the number of advertisers interested in a given inventory item (e.g., where two or more separate advertisers are interested in a given inventory item, the item may go to the first advertising will to pay a prescribed "premium").

Other business-related aspects of the present invention may be appreciated given the foregoing disclosure. For example, inventory may also auctioned, or provisioned based on loyalty or context (e.g., navigation based, day/time based, etc.). Further, inventory may be bundled to provide part of a campaign across several different platforms and/or devices.

Operations/Business Rules Engine—

In another aspect of the invention, the aforementioned audience classification system 220 (e.g., including one or more computer programs) optionally includes an entity having an operations and/or business rules "engine". This engine comprises, in an exemplary embodiment, a series of software routines that are adapted to control the generation, analysis and transmission of audience classification data. These rules may also be fully integrated within the aforementioned one or more computer programs and be controlled via the entity on which the program is run. In effect, the rules engine comprises a supervisory entity which monitors and selectively controls the generation, analysis, and/or transmission functions at a higher level, so as to implement desired operational or business rules of the MSO or other parties of interest.

The rules engine can be considered an overlay of sorts to the algorithms of the previously described one or more computer applications. For example, the exemplary computer application may invoke certain operational protocols or decision processes based on data received (e.g., historical activity data, subscriber preferences, etc.), as well as network operational or historical data, demographic data, geographic data, etc. However, these processes may not always be compatible with higher-level business or operational goals, such as maximizing profit on a network-wide basis (or after consideration of other factors not examined by the collecting entities such as advertising revenue, RTA/acquisition costs, "costs" of delivering streams based on required bandwidth, taxes, maintenance or repair costs, additional equipment leasing or use costs, etc.), or system reliability and/or flexibility. Moreover, the application may be operating on a per-CPE, per-household, or per-request basis (i.e., evaluating each individual CPE effectively in isolation, and generating an insertion decision without considering larger patterns or decisions being made in the service group or network as a whole).

Hence, when imposed, the business/operational rules can be used to dynamically (or manually) control the operation of the aforementioned processes in conjunction with the analysis and transmission functions previously described in order to meet the advertiser's goals.

For example, one rule implemented by the rules engine may comprise selectively transmitting or analyzing data regarding viewership only from certain users; e.g., those who have agreed to have their viewership data collected. Accordingly, only those users who affirmatively "opt in" will have audience research data collected about their household or CPE 106. In another variant, insertion and/or recommendation of targeted content is provided only to users who agree to have viewership data collected.

As noted throughout, a user may elect in the present invention not to have personal identifying information or data regarding viewership collected and transmitted, and/or not to have any such data collected utilized for targeted content generation and insertion and/or recommendation. Thus, an incentive may be offered to those users who affirmatively agree to collection and transmission of audience research data and/or to targeted insertion or recommendation of content. For example, a user may be offered the targeted content free or at a reduced price (if it is purchasable content, such as VOD, Pay-per-View etc.), or may be offered other services at no charge or at a reduced price.

As another alternative rule, inventory (i.e., placement opportunities combined with a particular viewership) may only be assigned to given advertisers who meet certain reliability and/or quality standards, or who have been pre-qualified by the MSO (irrespective of whether they would add revenue or profit for the MSO).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A method of advertising management for use in a content distribution network, comprising:

receiving first information regarding a weight or variance to be applied to at least one demographic criteria to be met by a first audience of an advertisement at an advertising management apparatus within said content distribution network;

receiving second information regarding at least one parameter relating a second audience to an opportunity for insertion of one or more advertisements at said advertising management apparatus;

utilizing said advertising management apparatus to generate first data related to a quality of a match between said first information and said second information;

said advertising management apparatus adjusting said weight or said variance to be applied to said at least one demographic criteria to be met by said first audience based at least in part on said first data related to said quality of said match; and utilizing at least said adjusted weight or said adjusted variance to generate second data related to said quality of said match.

2. The method of claim 1, further comprising obtaining information relating said second audience from one or more records relating to respective one or more subscribers of said network, said records maintained by an operator of said network.

3. The method of claim 1, further comprising obtaining information relating said second audience from respective consumer premises equipment (CPE) in use by said second audience.

4. The method of claim 1, further comprising selecting one or more advertisements for insertion at said opportunity, said act or selecting based at least in part on said second data relating to said quality of said match.

5. The method of claim 4, wherein said act of utilizing at least said adjusted weight or said adjusted variance to generate second data related to said quality of said match further comprises determining, for a selected delivery platform, a projection of future demand of content; and wherein said act of selecting said one or more advertisements is based at least in part on said projection.

6. The method of claim 4, wherein said act of selecting is based at least in part on a relationship between a subject matter of said one or more advertisements and a subject matter of a least a portion of primary content, said primary content having one or more scheduled ones of said opportunities into which said one or more advertisements are to be inserted.

7. An advertising management apparatus for use in a content delivery network, comprising:

computerized apparatus comprising a processor and at least one storage device in data communication therewith, said at least one storage device configured to store a computer program comprising a plurality of instructions configured to, when executed cause said advertising management apparatus to:

access first data regarding one or more target audience qualities of an advertisement;

access second data regarding one or more audiences at a plurality of insertion opportunities;

generate data relating to a quality of a match between said first data and said second data;

adjust a weight or a variance to be applied to at least one demographic criteria to be met by said one or more target audiences based at least in part on said generated data related to said quality of said match;

utilize at least said adjusted weight or said adjusted variance to generate second data related to said quality of said match; and utilize said generated second data to determine whether a number of instances where said quality of said match would be sufficient to cause selection of said advertisement for insertion meets or exceeds a threshold.

8. The apparatus of claim 7, wherein said computerized apparatus comprises a computer or server disposed within an extant advertising insertion system of said network.

9. The apparatus of claim 7, wherein said second data comprises an advertising inventory.

10. The apparatus of claim 7, wherein said second data is obtained from at least one of: (i) records relating to one or more subscribers of said network maintained by an operator of said network, and (ii) data obtained by said operator of said network via respective consumer premises equipment (CPE) of said one or more subscribers.

11. The apparatus of claim 7, wherein said computer program is further configured to, when executed, select one or more advertisements for insertion at individual ones of said plurality of insertion opportunities based at least in part on said generated data relating to said quality of said match.

12. The apparatus of claim 11, wherein:

said generation of said data regarding said quality of said match comprises determining, for a selected delivery platform, a projection of future demand for delivery of content via said delivery platform; and said selection of said one or more advertisements is based at least in part on said projection.

13. The apparatus of claim 12, wherein said projection is based at least in part on a linear regression of historical usage data of said delivery platform.

14. The apparatus of claim 11, wherein said selection is based at least in part on a relationship between a subject matter of said selected one or more advertisements and that of at least a portion of primary content into which said selected one or more advertisements are being inserted.

15. The apparatus of claim 11, wherein said selection is based at least in part on one or more advertising campaign goals provided by an advertiser, said advertising campaign comprising a plurality of advertisements and including at least one of said selected one or more advertisements.

16. A method of managing advertising within a network comprising:

accessing first information regarding a plurality of placement opportunities for advertisements using a management entity of said network;

accessing second information regarding an audience associated with individual ones of said plurality of placement opportunities using said management entity of said network;

accessing third information identifying a target audience associated with one or more advertisements within a campaign using said management entity of said network;

comparing a number of instances where said target audience matches said audience associated with individual ones of said plurality of placement opportunities to an advertiser provided threshold number; and when it is determined that said number of instances does not meet or exceed said threshold number, said management entity of said network adjusting one or more aspects of said target audience associated with said one or more advertisements within said campaign.

17. The method of claim 16, wherein said act of accessing first information regarding said plurality of placement opportunities and said second information regarding said audience associated with individual ones of said plurality of placement opportunities comprises accessing an advertising inventory data structure having both said first and second information contained therein.

18. The method of claim 16, wherein said first information regarding said plurality of placement opportunities comprises time slots available for inserting one or more advertisements; and wherein said second information regarding said audience associated with individual ones of said plurality of placement opportunities comprises demographic information.

19. The method of claim 16, wherein said method further comprises selecting one or more advertisements for which a target audience of each of said one or more advertisements has at least a first level of similarity to said audience associated with said individual ones of said plurality of placement opportunities.

20. The method of claim 16, wherein said method further comprises selecting one or more advertisements that can fit into a time slot associated with a respective opportunity and that are compatible with a delivery platform associated with said respective opportunity.

* * * * *